(12) United States Patent
Tu et al.

(10) Patent No.: US 10,368,379 B2
(45) Date of Patent: Jul. 30, 2019

(54) METHODS AND APPARATUS FOR DETERMINING DEVICE-TO-DEVICE TRANSMISSION PATTERNS

(71) Applicant: INTERDIGITAL PATENT HOLDINGS, INC., Wilmington, DE (US)

(72) Inventors: Chao-Cheng Tu, Brossard (CA); Benoit Pelletier, Roxboro (CA); Paul Marinier, Brossard (CA); Marian Rudolf, Vienna (AT)

(73) Assignee: INTERDIGITAL PATENT HOLDINGS, INC., Wilmington, DE (US)

(*) Notice: Subject to any disclaimer, the term of this patent is extended or adjusted under 35 U.S.C. 154(b) by 0 days.

(21) Appl. No.: 15/916,562

(22) Filed: Mar. 9, 2018

(65) Prior Publication Data

US 2018/0199389 A1   Jul. 12, 2018

Related U.S. Application Data

(63) Continuation of application No. 14/819,245, filed on Aug. 5, 2015, now Pat. No. 9,930,709.
(Continued)

(51) Int. Cl.
*H04W 76/14* (2018.01)
*H04W 72/12* (2009.01)
(Continued)

(52) U.S. Cl.
CPC ....... *H04W 76/14* (2018.02); *H04W 72/1252* (2013.01); *H04W 74/04* (2013.01); *H04W 74/0833* (2013.01)

(58) Field of Classification Search
CPC . H04W 76/14; H04W 72/1252; H04W 74/04; H04W 74/0833
See application file for complete search history.

(56) References Cited

U.S. PATENT DOCUMENTS 6,745,150 B1 * 6/2004 Breiman ............... G06F 17/18
   702/181
9,277,454 B2   3/2016 Liao et al.
(Continued)

FOREIGN PATENT DOCUMENTS

JP   2008301422 A2   12/2008
JP   2012143002 A2   7/2012
WO      14/113537    6/2014

OTHER PUBLICATIONS

Alcatel-Lucent, "Chairman's Notes of Agenda Item 7.2.3 LTE Device to Device Proximity Services," 3GPP TSG-RAN1 #78, R1-143590, Dresden, Germany, Aug. 18-22, 2014.
(Continued)

*Primary Examiner* — Ronald B Abelson
(74) *Attorney, Agent, or Firm* — Volpe and Koenig, P.C.

(57) ABSTRACT

Embodiments include methods, systems, and apparatuses for a first wireless transmit/receive unit (WTRU) to perform device-to-device (D2D) communication directly with a second WTRU is disclosed. The embodiments may include determining a base pattern length to use for the D2D communication based on at least a transmission configuration. A base pattern may be selected from one or more base patterns having the determined base pattern length based on an indication from a network. The selected base pattern may have one or more transmission opportunities. One or more data packets may be transmitted to the second WTRU in at least one of the one or more transmission opportunities of the selected base pattern.

18 Claims, 11 Drawing Sheets

Related U.S. Application Data

(60) Provisional application No. 62/034,025, filed on Aug. 6, 2014, provisional application No. 62/054,809, filed on Sep. 24, 2014, provisional application No. 62/075,604, filed on Nov. 5, 2014.

(51) Int. Cl.
*H04W 74/04* (2009.01)
*H04W 74/08* (2009.01)

(56) References Cited

U.S. PATENT DOCUMENTS

| | | | |
|---|---|---|---|
| 2011/0092238 A1* | 4/2011 | Ishibashi | H04B 7/00 |
| 2013/0163555 A1 | 6/2013 | Turtinen et al. | |
| 2013/0258996 A1 | 10/2013 | Jung et al. | |
| 2014/0126530 A1 | 5/2014 | Siomina et al. | |
| 2014/0153390 A1 | 6/2014 | Ishii et al. | |
| 2015/0031406 A1* | 1/2015 | Fouad | H04W 16/10 455/509 |
| 2016/0249355 A1 | 8/2016 | Chae et al. | |

OTHER PUBLICATIONS

Ericsson, "D2D Physical Channels Design," 3GPP TSG-RAN1 #77, R1-142398, Seoul, Korea, May 19-23 2014.

Intel Corporation, "On Remaining Details of T-RPT Design for D2D Communication," R1-143765, 3GPP TSG RAN WG1 Meeting #78bis, Ljubljana, Solvenia, Oct. 6-10, 2014.

Interdigital, "Remaining details of T-RPT design for data," 3GPP TSG-RAN1 #78bis, R1-144214, Ljubljana, Slovenia, Oct. 6-10, 2014.

Mathworks, "LTE Sidelink Resource Pools and PSCCH Period," MATLAB Examples, Available at: https://www.mathworks.com/examples/lte-system/mw/lte_product-SidelinkResourcePoolExample-lte-sidelink-resource-pools-and-pscch-period (retrieved on Sep. 7, 2017).

MCC Support, "Final Report of 3GPP TSG RAN WG1 #61 v1.0.0 (Montreal, Canada, May 10-14, 2010)," 3GPP TSG RAN WG1 Meeting #61bis, R1-103431, Dresden, Germany, Jun. 28-Jul. 2, 2010.

MCC Support, "Final Report of 3GPP TSG RAN WG1 #61bis v1.0.0 (Dresden, Germany, Jun. 28-Jul. 2, 2010)," 3GPP TSG-RAN1 #62, R1-104271, Madrid, Spain, Aug. 23-27, 2010.

Third Generation Partnership Project, "Technical Specification Group Radio Access Network; Evolved Universal Terrestrial Radio Access (E-UTRA); Physical layer procedures (Release 12)," 3GPP TR 36.213 V12.2.0 (Jun. 2014).

Third Generation Partnership Project, "Technical Specification Group Radio Access Network; Evolved Universal Terrestrial Radio Access (E-UTRA); Physical layer procedures (Release 12)," 3GPP TR 36.213 V12.6.0 (Jun. 2015).

Third Generation Partnership Project, "Technical Specification Group Radio Access Network; Evolved Universal Terrestrial Radio Access (E-UTRA); User Equipment (UE) radio transmission and reception (Release 12)," 3GPP TS 36.101 V12.4.0 (Jun. 2014).

Third Generation Partnership Project, "Technical Specification Group Radio Access Network; Evolved Universal Terrestrial Radio Access (E-UTRA); User Equipment (UE) radio transmission and reception (Release 13)," 3GPP TS 36.101 V13.0.0 (Jul. 2015).

Third Generation Partnership Project, "Technical Specification Group Radio Access Network; Evolved Universal Terrestrial Radio Access (E-UTRA); Multiplexing and channel coding (Release 12)," 3GPP TS 36.212 V12.1.0 (Jun. 2014).

Third Generation Partnership Project, "Technical Specification Group Radio Access Network; Evolved Universal Terrestrial Radio Access (E-UTRA); Multiplexing and channel coding (Release 12)," 3GPP TS 36.212 V.12.5.0 (Jun. 2015).

* cited by examiner

METHODS AND APPARATUS FOR DETERMINING DEVICE-TO-DEVICE TRANSMISSION PATTERNS

CROSS REFERENCE TO RELATED APPLICATIONS

This application is a continuation of U.S. patent application Ser. No. 14/819,245 filed Aug. 5, 2015, which claims the benefit of U.S. Provisional Patent Application No. 62/034,025 filed on Aug. 6, 2014, U.S. Provisional Patent Application No. 62/054,809 filed on Sep. 24, 2014, and U.S. Provisional Patent Application No. 62/075,604 filed on Nov. 5, 2014, the contents of which are hereby incorporated by reference herein.

BACKGROUND

Long Term Evolution (LTE) communication is becoming more widespread as the technology matures and is starting to be used in new areas. Recently, public safety officials (e.g. police, firefighters, paramedics) have shown growing interests in using LTE as their main communication tool. However, current versions of LTE however only work under network coverage, which may be a limitation for many public safety situations.

SUMMARY

In an embodiment, a method for a first wireless transmit/receive unit (WTRU) to perform device-to-device (D2D) communication directly with a second WTRU is disclosed. The method may include determining a base pattern length to use for the D2D communication based on at least a transmission configuration. A base pattern may be selected from one or more base patterns having the determined base pattern length based on an indication from a network. The selected base pattern may have one or more transmission opportunities. One or more data packets may be transmitted to the second WTRU in at least one of the one or more transmission opportunities of the selected base pattern.

In another embodiment, a WTRU for performing D2D communication directly with another WTRU is disclosed. The WTRU may include a processor and an antenna operatively coupled to the processor. The processor may be configured to determine a base pattern length to use for the D2D communication based on at least a transmission configuration. The processor further may be further configured to select a base pattern from one or more base patterns having the determined base pattern length based on an indication from a network. The selected base pattern may have one or more transmission opportunities. The processor and the antenna may be configured to transmit one or more data packets to the another WTRU in at least one of the one or more transmission opportunities of the selected base pattern.

BRIEF DESCRIPTION OF THE DRAWINGS

A more detailed understanding may be had from the following description, given by way of example in conjunction with the accompanying drawings wherein.

DETAILED DESCRIPTION

The Third Generation Partnership Project (3GPP) is developing solutions to support direct communication between devices (i.e. device-to-device or D2D) for LTE, but the focus has mostly been on half-duplex voice over internet protocol (VoIP) applications. Resource allocation and scheduling may be a major component of D2D communications, e.g. for out-of-network coverage. For conventional LTE, an eNode B may control resource allocation and scheduling, but this may not be possible for out-of-network coverage. For D2D, the resource allocation may include a transmission pattern characterized by a set of sub-frames to transmit and receive.

A typical VoIP packet may be generated every 20 ms from a codec. For example, a typical half-duplex VoIP transmission pattern may be defined over duration as short as 20 ms. Further, simulation results show that to reach a predetermined coverage, at least four (4) blind re-transmissions of each VoIP packet may be used. In this scenario, a typical transmission pattern supporting VoIP may use approximately 5 transmissions over a 20 ms period. Other traffic types, such as file transfer protocol (FTP), web browsing, video streaming, unicast communications, and gaming are likely to be used for D2D applications. To accommodate these additional features, resource allocation and associated signaling may be designed accordingly.

Examples described herein with reference to FIGS. 1A-10B address the design, construction and selection of base patterns and associated control signaling for D2D communications. Examples described herein may address how to provide base patterns in a scheduling period when the number of medium access control (MAC) protocol data units (PDUs) is larger than the number of MAC PDUs that a family of pre-determined base patterns can support (e.g., multiple concurrent hybrid automatic repeat request (H-ARQ) processes). Examples may also address how to provide base patterns in a scheduling period when the number of MAC PDUs is smaller than the number of MAC PDUs that a family of pre-determined base patterns can support. In addition, examples may address how to select a base pattern or base patterns to minimize interference with other communications and use resources efficiently.

Figure 1A:
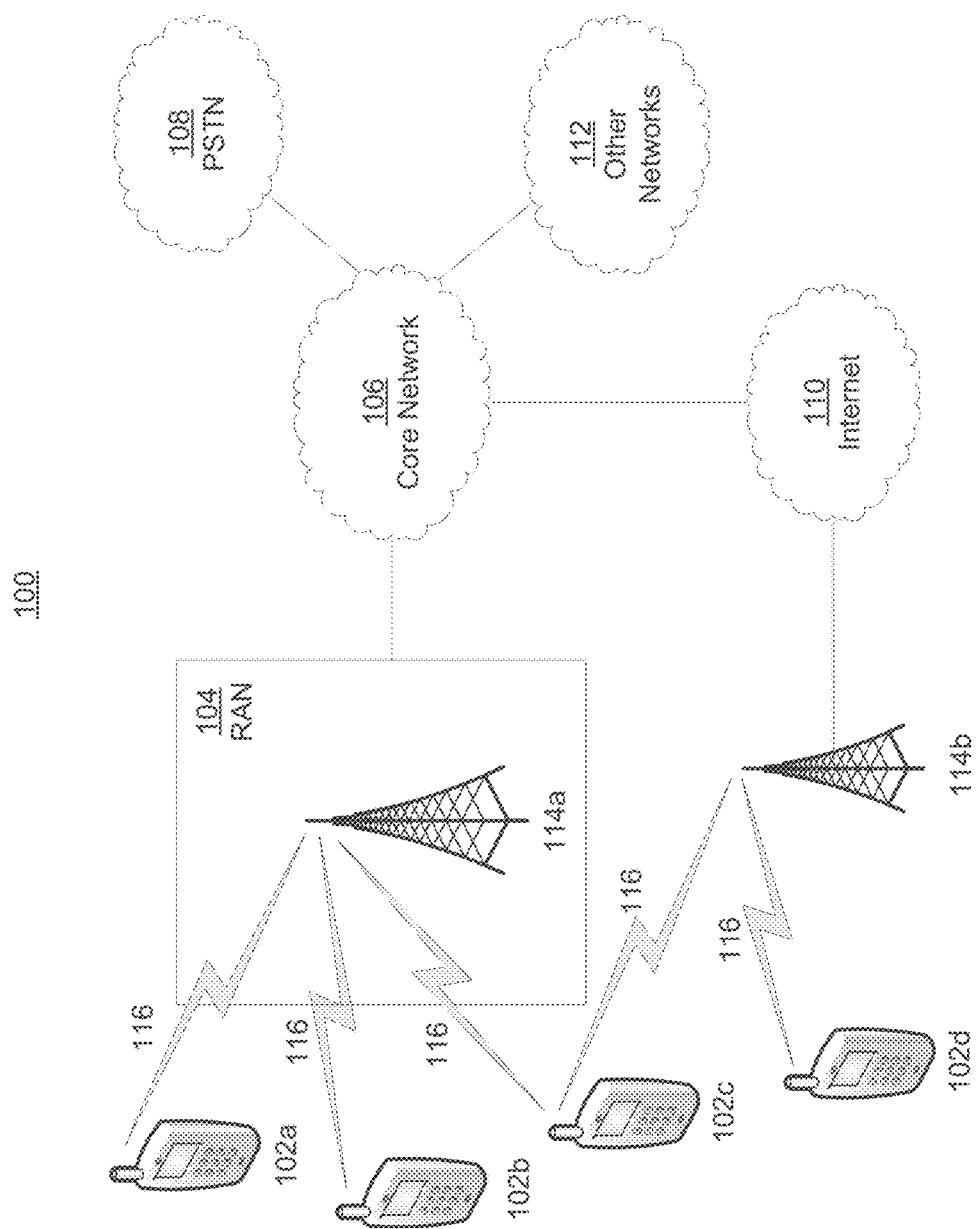
FIG. 1A is a system diagram of an example communications system in which one or more disclosed embodiments may be implemented.

Referring now to FIG. 1A, a diagram of an example communications system 100 in which one or more disclosed embodiments may be implemented is shown. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using LTE and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
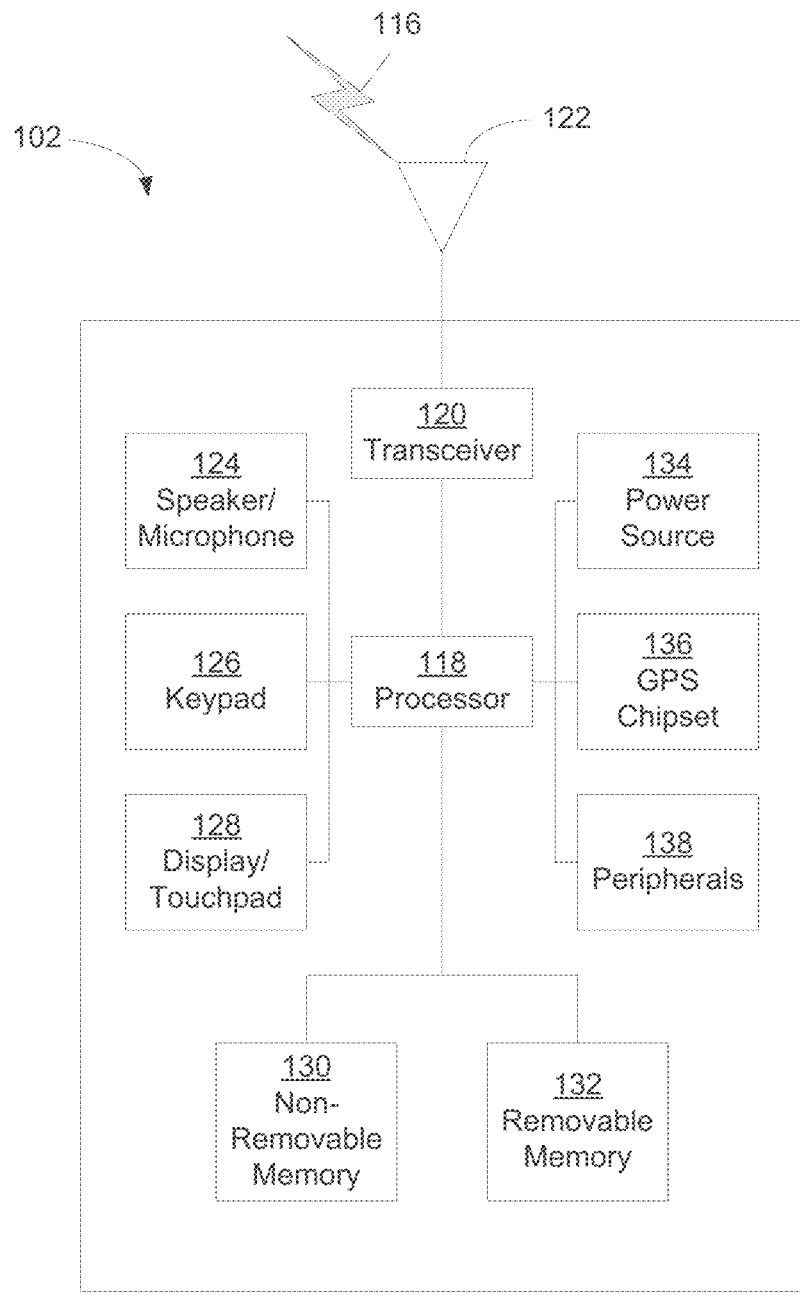
FIG. 1B is a system diagram of an example wireless transmit/receive unit (WTRU) that may be used within the communications system illustrated in FIG. 1A.

Referring now to FIG. 1B, a system diagram of an example WTRU 102 is shown. The WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM)

radio unit, a digital music player, a media player, a video game player module, an Internet browser, and the like.

Figure 1C:
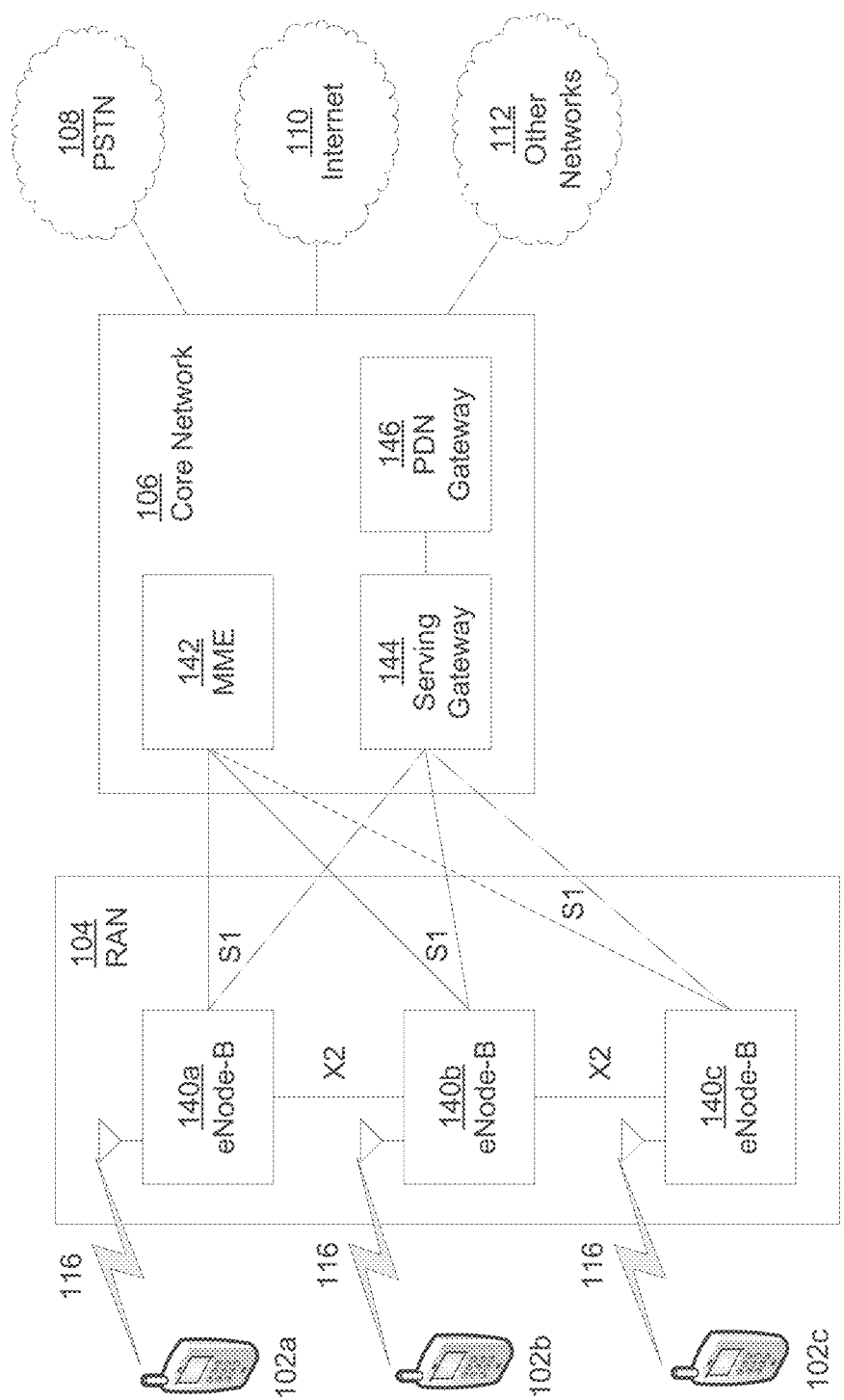
FIG. 1C is a system diagram of an example radio access network and an example core network that may be used within the communications system illustrated in FIG. 1A.

Referring now to FIG. 1C, a system diagram of the RAN 104 and the core network 106, according to an embodiment, is shown. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an Si interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the Si interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In the examples described herein, a family of D2D transmission patterns may be described. Such D2D transmission patterns are referred to herein as base patterns and may be used for a variety of data traffic and/or communications. It should be noted that although the following embodiments may use base patterns in context of VoIP applications, embodiments are considered in which the base patterns may be used in other forms of traffic. The following embodiments are provided for example, and are not intended to limit applications solely to VoIP traffic.

In VoIP applications, a typical base pattern may support a data packet generated every 20 ms. In one example, a base pattern may have a fixed length, either expressed as a number of sub-frames or absolute time, and a fixed number of sub-frames to transmit D2D data. In another example, a base pattern may have variable length to target meeting, for example, the VoIP transmission rate. A base pattern may also be indicated by a predetermined frequency hopping rule.

In the examples described herein, a base pattern may support one MAC PDU per transmission, and the number of total transmissions allowed in a base pattern may correspond to a hybrid-automatic repeat request (H-ARQ) transmission for the associated MAC PDU. Further, it may be assumed that the relationship between each transmission in a base pattern and the redundancy version is known. Thus, a base pattern may only be able to support a maximum transmission rate based, for example, on the maximum bandwidth that may be allocated or the pattern length.

In D2D communications, a WTRU 102 may be configured with a family of base patterns that are pre-determined. The family of base patterns may be indicated by a table entry, expressed as an equation, or generated by a pseudo-random generator.

Figure 2A:
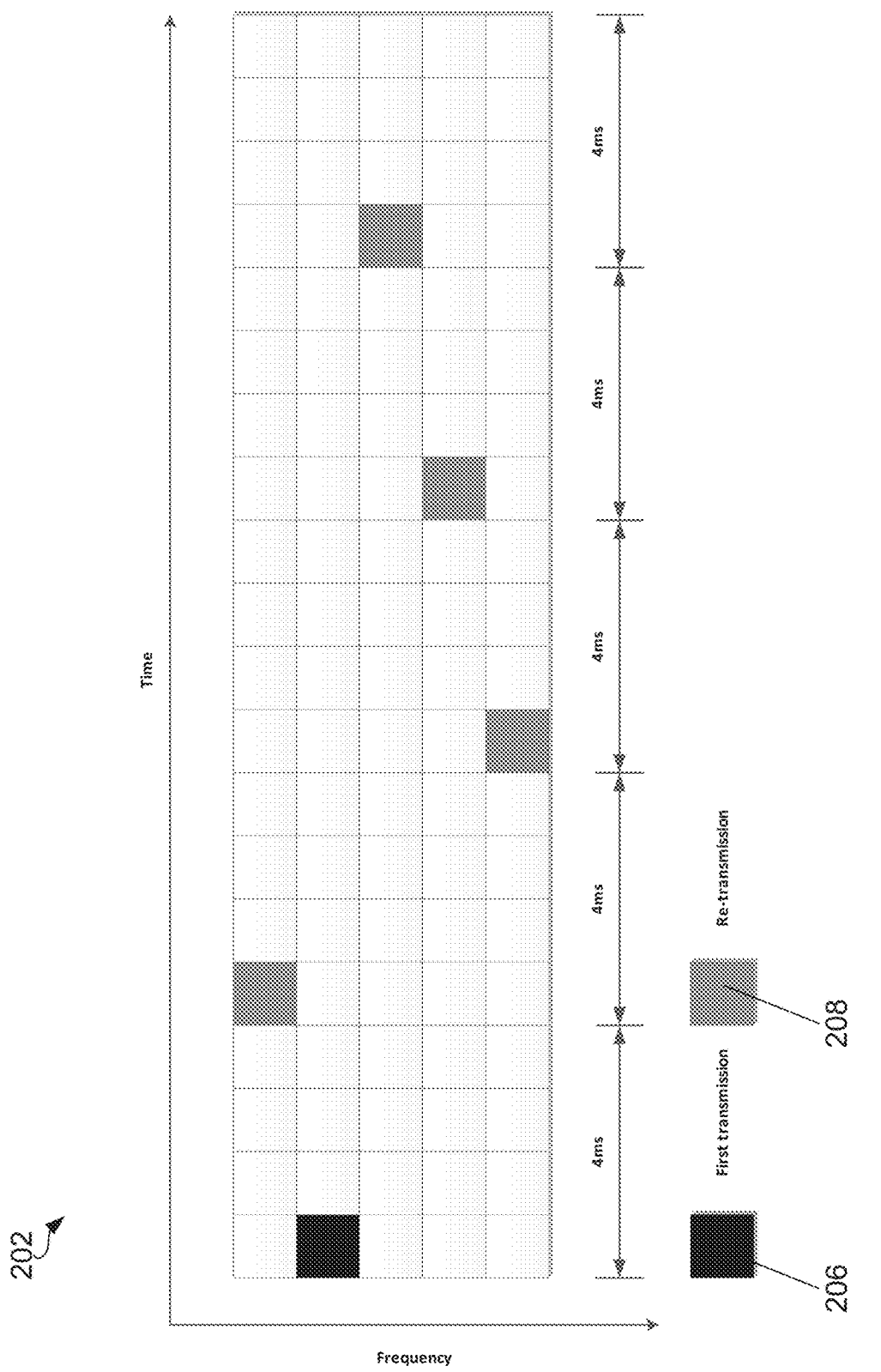
FIGS. 2A and 2B are diagrams of a first example base pattern and a second example base pattern for data transmissions.
Figure 2B:
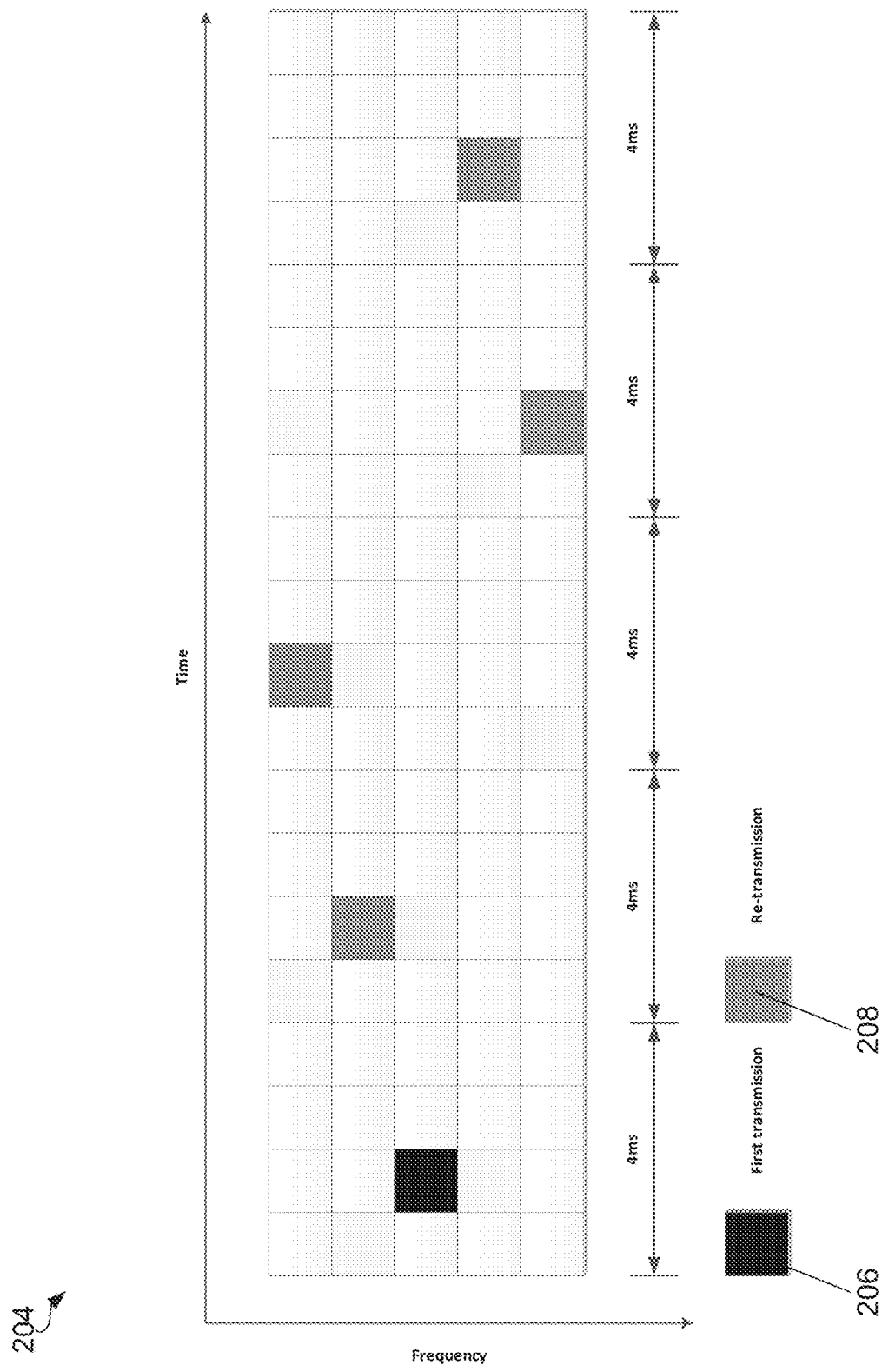

Referring now to FIGS. 2A and 2B, diagrams of a first base pattern 202 and a second base pattern 204 that may be used for D2D communication are shown. The first base pattern 202 and the second base pattern 204 may both fulfill the requirements for VoIP for D2D communication. In other words, the overall duration of the data transmission period (not shown) may be 160 ms, data packets 206 may be generated from a codec every 20 ms, there may be 4 blind re-transmissions 208 for each packet, and there may be a minimum of 4 ms between each blind re-transmission 208 to guarantee sufficient decoding time.

The data transmission period may be a period of time over which the D2D WTRU 102 transmits data, as indicated by an associated scheduling assignment (SA) (not shown) and may be described in terms of absolute time (e.g., 160 ms) or in terms of sub-frames allocated for D2D transmissions. A SA may be a control signal that may include, for example, the modulation and coding schemes (MCSs), identifiers, and information regarding the resources of time and/or frequency to be applied for data transmissions within the associated data transmission period.

In the examples illustrated in FIGS. 2A and 2B, the y-axis may represent the frequency domain and the x-axis may represent the time domain. However, in an embodiment, the y-axis may represent virtual frequency resources rather than physical frequency resources, regardless of whether the physical frequency resources are physical uplink control channel (PUCCH)-like or physical uplink shared channel (PUSCH)-like.

In an embodiment, a transmit WTRU 102 may be configured to indicate the base pattern parameters in the SA during a scheduling period. This may allow a receiving WTRU 102 to determine the D2D transmission patterns. Since the duration of the base patterns 202, 204 may be shorter than the data transmission period, the WTRU 102 may be configured to determine the rest of the transmission patterns from one or more of the following methods. In an embodiment, the WTRU 102 may determine a first base pattern 202, 204 from the SA, and the same base pattern 202, 204 may be repeated for the rest of the data transmission period. In another embodiment the WTRU 102 may determine one of multiple base patterns 202, 204 from the SA, and the WTRU 102 may be pre-configured to derive the rest of the data transmission patterns (i.e., the other base patterns 202, 204) for the rest of the data transmission period.

In an embodiment in which the transmit WTRU 102 uses a different base pattern 202, 204 during a scheduling period, the transmit and receive WTRUs 102 may each be aware of a sequence of the patterns. In one approach to determine one or more base patterns 202, 204 from the SA, the transmitting WTRU 102 may be configured with a subset of base patterns 202, 204, such as time resource patterns of transmission (T-RPTs), and may further select one base pattern 202, 204 from the subset. This base pattern 202, 204 may be used as a root base pattern 202, 204, which may define the base pattern sequence, possibly along with one or more parameters. The base pattern sequence may start, for example, with the selected root base pattern 202, 204 and iterate over the subset of base patterns 202, 204 throughout a specific period (e.g. either through the scheduling period or a shorter period of time where the sequence then repeats).

The sequence of base patterns 202, 204 may be determined, for example, by using the root base pattern 202, 204 (or its index) possibly in combination with one or more additional parameters. In one specific example, the base pattern sequence may be derived from the output of a pseudo-random number generator initialized with the value of the root base pattern 202, 204 that may be indicated in the SA in a T-RPT field. This may be optionally combined (e.g. using modulo addition, for example) with an identity (ID) or another parameter signaled in the SA.

In an embodiment, the output of the pseudo-random number generator may need to be adjusted in order to properly index base patterns 202, 204 from the selected subset. In one example, this may be achieved using a modulo operation to ensure that the indices have the appropriate range.

The WTRU 102 receiving the SA may determine the base sequence pattern by detecting the root base pattern 202, 204 in the T-RPT field and the ID signaled in the SA. The subset of base patterns 202, 204 may be assumed to be known to the WTRU 102 via higher layer signaling or pre-configuration.

Figure 3:
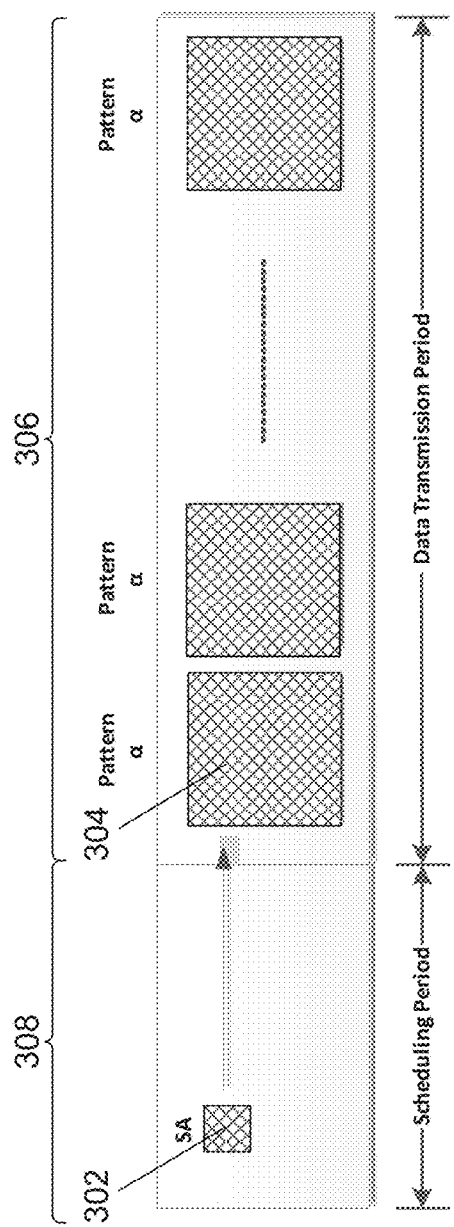
FIGS. 3 and 4 are diagrams of an embodiment where a wireless transmit and receive unit (WTRU) is configured to repeat a base pattern for an entire duration of a data transmission period.
Figure 4:
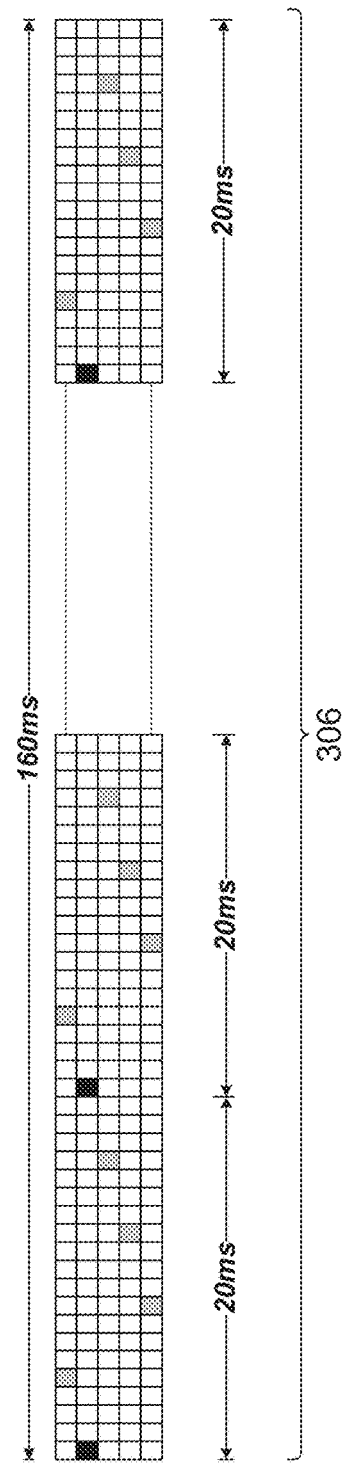

Referring now to FIGS. 3 and 4, diagrams of an embodiment where a WTRU 102 is configured to repeat a base pattern 304 for an entire duration of a data transmission period 306 are shown. In the example illustrated in FIG. 3, the SA 302 indicates to the WTRU 102 during a scheduling period 308 to repeat the base pattern 304 for the duration of the transmission period. This concept is illustrated in FIG. 4 where the base pattern 304 is repeated for the entire 160 ms data transmission period 306.

Figure 5:
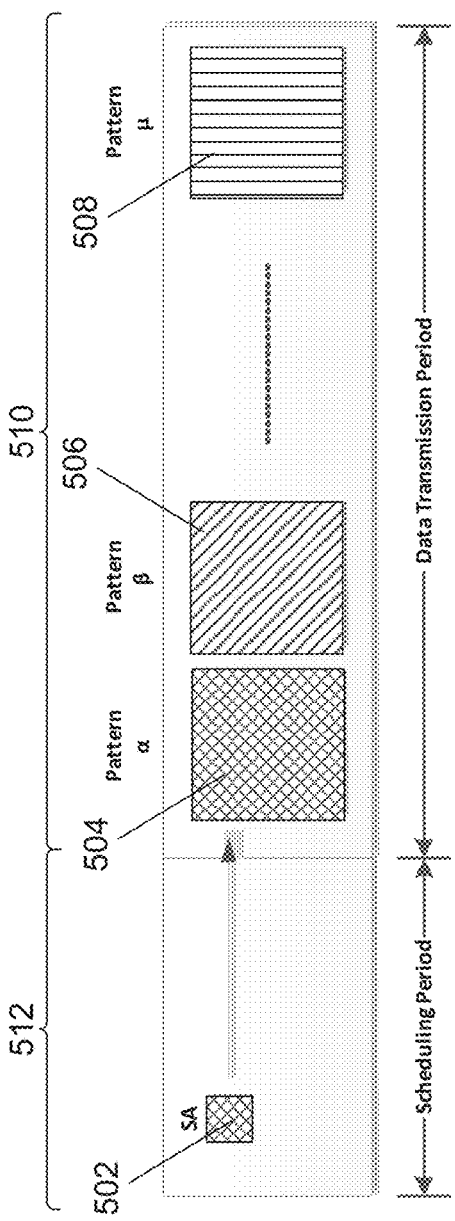
FIGS. 5 and 6 are diagrams of an example where a WTRU is configured to apply derivations of a first base pattern for the duration of the data transmission period.
Figure 6:
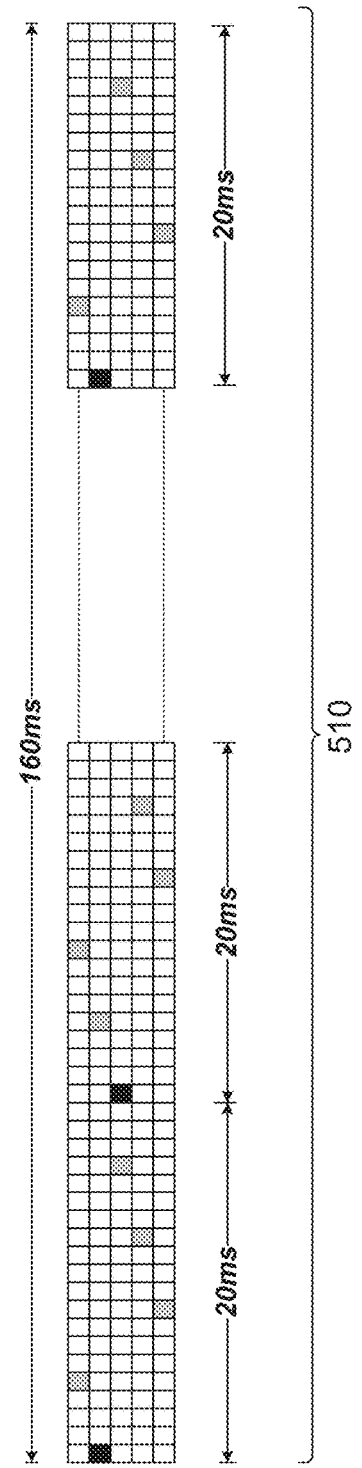

Referring now to FIGS. 5 and 6, diagrams of an example where a WTRU 102 is configured to apply derivations of a base pattern 504 for the duration of the data transmission period 510, as indicated by parameters in the SA 502 during a scheduling period 512, are shown. During the data transmission period 510, the base pattern 504, a second pattern 506, and a third pattern 508 may be transmitted. This concept is illustrated in FIG. 6 where the WTRU 102 is configured to transmit the base pattern 504, but with an additional frequency shift for each repetition (e.g., the second pattern 506 and the third pattern 508) for the entire 160 ms data transmission period 510.

It should be noted that the base patterns 304, 504 may be described with a time and frequency component. However, embodiments described herein may also apply to a case where the base patterns 304, 504 are determined only in time or frequency or in both time and frequency.

When selecting short patterns for data transmissions as described above, the maximum transmission rate of the WTRU 102 may be restricted by the available resources that may be used. Conventional D2D communications may not be scalable when more MAC PDUs need to be transmitted or when a higher data transmission rate is required. In addition, the WTRU 102 may have a reduced radio efficiency when less MAC PDUs are required to be transmitted during a scheduling period 308, 512 or when only a lower data transmission rate is needed. The resources associated with the base patterns 304, 504 may still be reserved for the WTRU 102 even though there is no data to be transmitted.

To achieve a higher data transmission capability, a WTRU 102 may be configured to use more resources by using one or more techniques, in any order or combination, including combining base patterns, extending base patterns, modifying the number of H-ARQ transmissions and/or employing different base patterns for each antenna of a D2D WTRU 102 that is equipped with multiple antennas.

In an embodiment, a WTRU 102 may be configured to use more resources by combining two or more base patterns 304, 504 in a scheduling period 308, 512. A scheduling period 308, 512 (or SA cycle) may be a period of time during which a SA 502 is transmitted and/or valid. A WTRU 102 may be configured to combine two or more base patterns 304, 504 based on a parameter, in any order or combination, such as: time-orthogonality, coverage scenarios, traffic type/quality of service (QoS) requirements/applications, interference control, WTRU 102 capabilities, wide area network (WAN) data traffic, measurements, and/or pseudo-random selection.

With respect to time-orthogonality, base patterns 304, 504 may be configured based on their mutual time-orthogonality properties. Two base patterns 304, 504 may be considered for combination when they are time-orthogonal, meaning that transmissions between the two base patterns 304, 504 do not overlap in time (e.g., in the same sub-frame), regardless of the potential frequency allocation.

In an embodiment, the WTRU 102 may be configured with a parameter related to the effective range (e.g., in meters) or type of location (e.g., office, movie theater, or stadium) for D2D communications. The WTRU 102 may have fewer restrictions when the interested coverage area is geographically smaller and the WTRU 102 may use more flexible combinations of base patterns 304, 504.

In an embodiment, the WTRU 102 may be configured to select combinations of base patterns 304, 504 based on the traffic type of the D2D communication, QoS requirements, or application. For example, a WTRU 102 may be configured with base pattern families designed for VoIP-type of applications, video streaming, or full-buffer communications such as file transfer protocol (FTP). The WTRU 102 may be configured, for example, to combine only base patterns 304, 504 of the same base pattern family. For application of FTP, the WTRU 102 may be configured to combine several base patterns 304, 504 to support a desired data rate.

In an embodiment, the WTRU 102 may be configured to select base patterns 304, 504 to be combined such that less interference between the base patterns 304, 504 is caused compared to other possible combinations of base patterns 304, 504. In an embodiment, the WTRU 102 may be configured to estimate the amount of interference caused to other WTRUs 102 by taking measurements.

In an embodiment, the WTRU 102 may be configured to select one or more base patterns 304, 504 or base pattern combinations based on WTRU 102 capability. For example, a WTRU 102 may have limited access to predetermined frequency ranges, bandwidth, or radio frequency (RF) design considerations. This may thereby limit flexibility in selecting base patterns 304, 504 and, in general, base pattern combinations.

For WAN data traffic, in an embodiment, the base patterns 304, 504 may be defined over all sub-frames (as opposed to only sub-frames allocated for D2D communication) when the WTRU 102 is in partial-coverage scenarios or is aware of an absolute or relative time period that WAN data is allocated. A WTRU 102 may be configured to avoid selecting base patterns 304, 504 and base pattern combinations for which a transmission occasion may overlap with a WAN transmission (e.g., a transmission to the base station 114). A transmission occasion pattern may include a set of sub-frames that are allowed for D2D transmission (e.g., as configured by a base station 114 or pre-configured for out-of-coverage). A time-resource pattern of transmission (T-RPT) may be defined over a transmission occasion pattern and may include a set of sub-frames used by a WTRU 102 for transmitting data. A T-RPT may indicate resources for transmission of each MAC PDU. For multiple MAC PDUs, a T-RPT may indicate a transmission interval or intervals between them.

In an embodiment, the WTRU 102 may be configured to select base patterns 304, 504 or base pattern combinations based on measurements. For example, the WTRU 102 may be configured to select base patterns 304, 504 or a base pattern combination in consideration of the SA 302, 502 and/or the previous data transmission periods 306, 510. With respect to the SA 302, 502, the WTRU 102 may be configured to receive SA 302, 502 transmissions from other WTRUs 102 to make the base pattern 304, 504 selection. With respect to the previous data transmission periods 306, 510, the WTRU 102 may be configured to select a base pattern 304, 504 or base pattern combination based on power/radio measurements made during the transmission period 306, 510.

In an embodiment, the WTRU 102 may be configured to select base patterns 304, 504 or base pattern combinations randomly, or pseudo-randomly in consideration of one or more of identifiers, number of MAC PDUs and/or cyclic redundancy checks (CRCs).

In an embodiment, the transmit WTRU 102 may be configured to use less than all the transmission opportunities available in a transmission period. The WTRU 102 may be configured to exploit the un-used transmission opportunities for one or more of the following: indicating that data transmission is finished, indicating that the resources are available, sending reference signals, sending additional D2D control signals, measuring possible interference, receiving possible configuration signals from nearby base stations 114, receiving data from destination WTRUs 102 and/or receiving feedback information.

Figure 7:
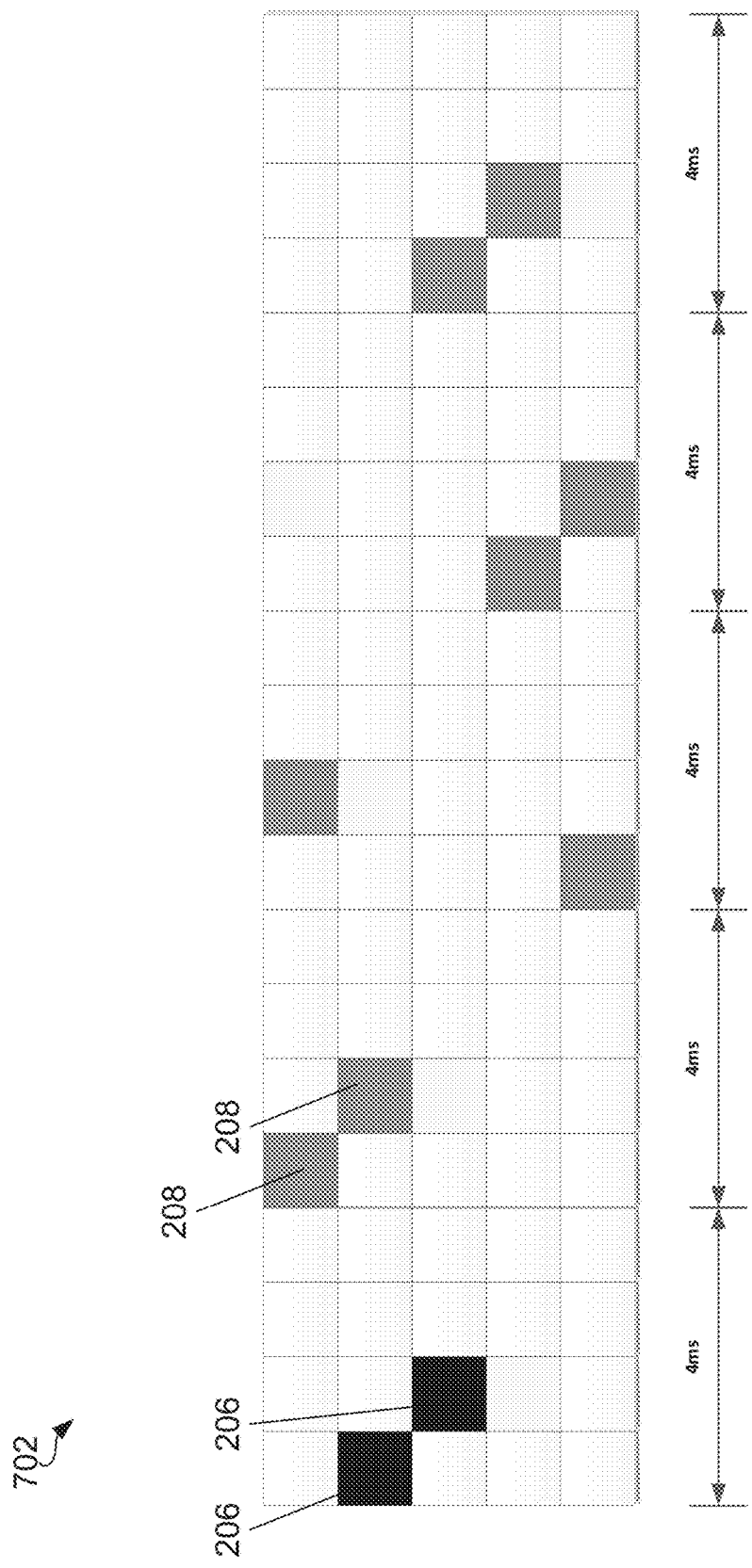
FIG. 7 is a diagram of an example combination pattern including data packets and blind re-transmissions combined from more than one base pattern.

Referring now to FIG. 7, in an embodiment, the WTRU 102 may be configured to achieve twice the transmission data rate supported by conventional base patterns 304, 504. The WTRU 102 may be configured to employ a combination of time-orthogonal base patterns 304, 504, such as the base patterns illustrated in FIGS. 2A and 2B, for the data transmission period. FIG. 7 is a diagram of an example combination pattern 702 including the data packets 206 and the blind re-transmissions 208 from base patterns 202 and 204 (FIGS. 2A and 2B) is shown.

In an embodiment, the WTRU 102 may be configured to acquire more resources by extending one or more base patterns 304, 504 using pre-configuration or as indicated by signaling to the WTRU 102. The WTRU 102 may be preconfigured to extend available resources for data transmissions in one or more parameters, such as time (by extending to n number of consecutive time frames), frequency (by n number of consecutive resource blocks (RBs) towards the center frequency or the band edge, depending on configuration), or antenna polarizations/direction.

Similar to the examples described above with respect to combining base patterns, the WTRU 102 may be configured to extend available data resources taking into consideration, in any order or combination, time-orthogonality, coverage scenarios, traffic types/QoS requirements/applications, interference control, WTRU 102 data traffic, measurements (e.g., in consideration of one or more of SA and/or previous data transmission periods) and/or pseudo-random selection (e.g., in consideration of one or more of identifiers, number of MAC PDUs and/or CRCs).

Simpler control signaling may be associated with extending base patterns 304, 504 rather than combining them as described above. A reduced number of base patterns 304, 504 may need to be specified when the base patterns 304, 504 are extended rather than combined.

Figure 8:
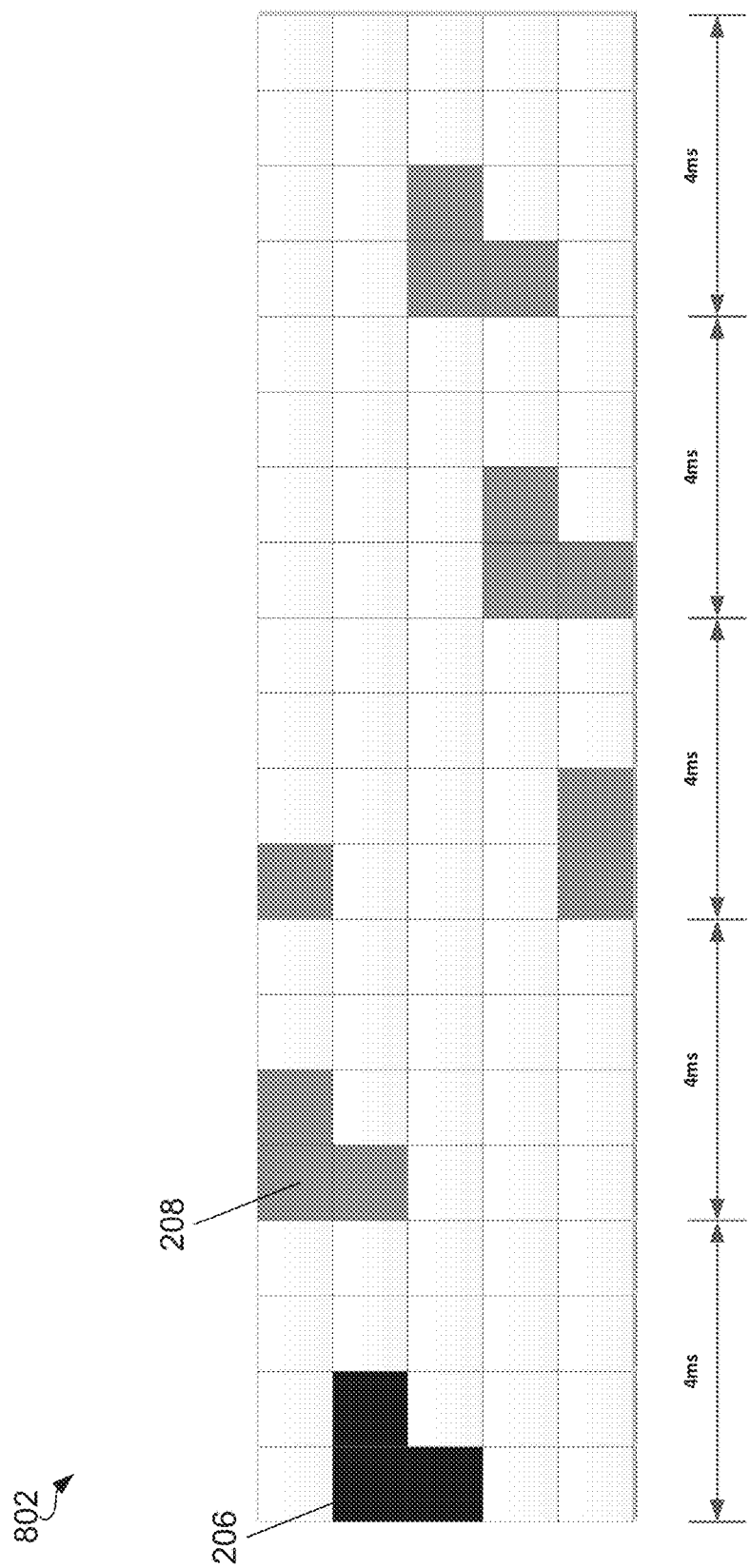
FIG. 8 is an extended pattern including data packets and blind re-transmissions that are extended in both time and frequency.

Referring now to FIG. 8, a diagram of an example where the WTRU 102 is configured to indicate a base pattern 304, 504 and the associated extension resources directly adjacent to the base pattern 304, 504 in time and frequency is shown. FIG. 8 shows an extended pattern 802 in which the data packets 206 and the blind re-transmissions 208 of the base pattern 202 (FIG. 2A) have been extended in both time and frequency.

Figure 9:
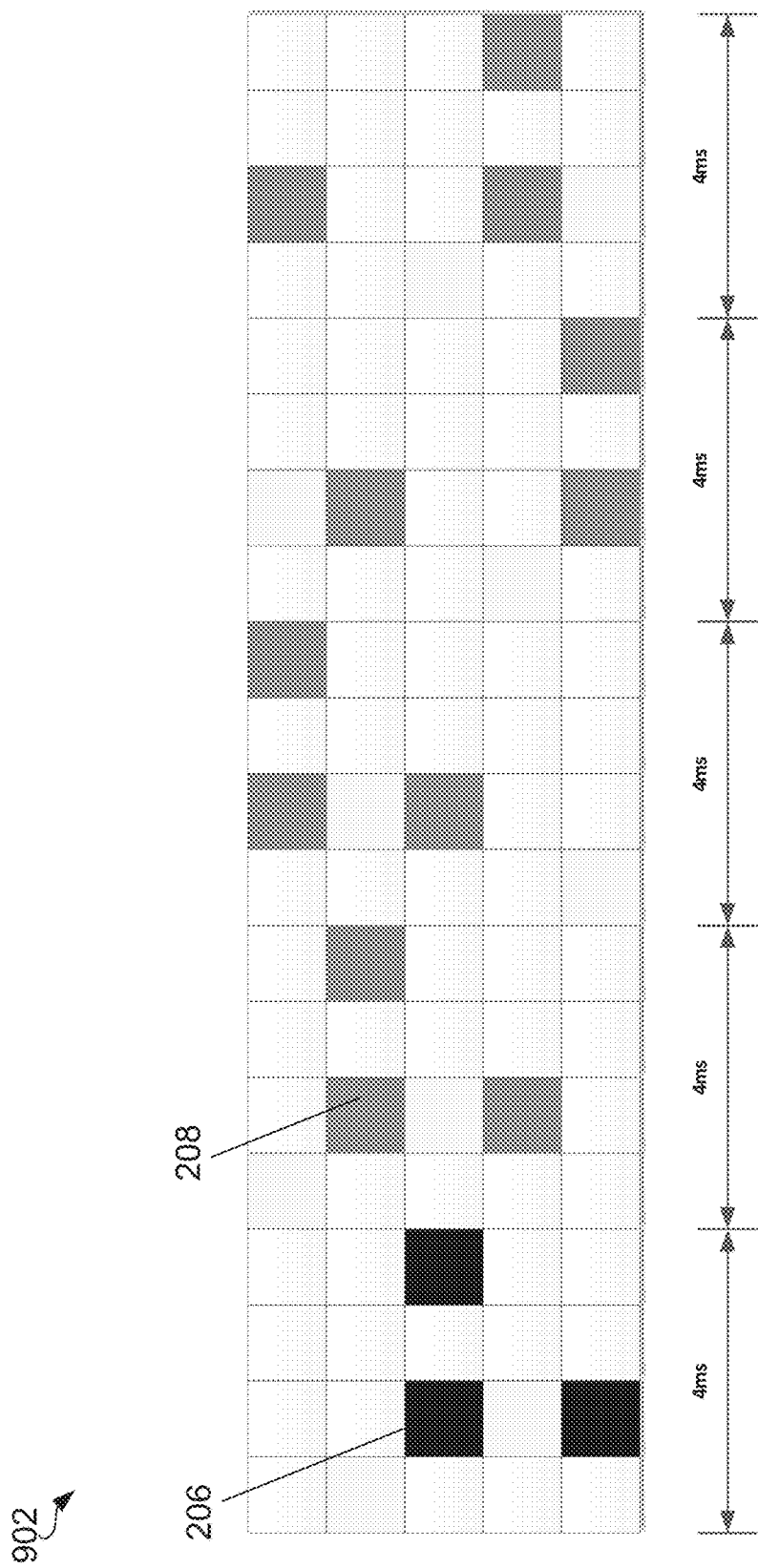
FIG. 9 is a diagram of an example where the WTRU is configured to indicate a base pattern and a set of non-adjacent time and frequency resources.

Referring to FIG. 9, a diagram of an example where the WTRU 102 is configured to indicate a base pattern 304, 504 and a set of non-adjacent time and frequency resources. This may accommodate for any delay requirements of feedback information from the additional time resource. In other words, it may allow the WTRU 102 to receive feedback information between transmissions). It may also allow for the WTRU 102 to exploit possible frequency diversity from wireless channels from the additional frequency resources. FIG. 9 shows an extend pattern 902 in which the data packets 206 and the blind re-transmissions 208 of base pattern 204 of FIG. 2B are extended with additional time and frequency resources as indicated.

In an embodiment, the number of H-ARQ transmissions of a base pattern 304, 504 may be modified. The base patterns 304, 504 may be associated with a predetermined number of re-transmissions 208 to meet a predetermined performance requirement. For example, the number of required re-transmissions may be configured as four (4) for VoIP applications. To meet higher data transmission capability, a WTRU 102 may be configured to send a smaller number of blind re-transmissions 208 to relax in some scenarios. However, this may be at the expense of radio coverage.

The WTRU 102 may be configured to relax the number of re-transmissions 208 in a base pattern 304, 504 in consideration of one or more parameters, in any order or combination, including minimum performance requirements, coverage scenarios, traffic types/QoS requirements/applications, MCSs used for data transmissions, interference control, and WTRU 102 capabilities. In an embodiment, the WTRU 102 may be configured to lower its minimum performance requirements in exchange for a higher data transmission rate. In an embodiment, the WTRU 102 may be configured so that the related traffic types/QoS requirements/applications are more error resilient than conventional techniques. In an embodiment, the WTRU 102 may be configured with a lower order or modulation, such as binary phase shift keying (BPSK), or a lower coding rate so that a smaller number of re-transmissions 208 is required.

When identifying the needs for a relaxed number of re-transmissions 208, the WTRU 102 may be configured with a pre-determined table. The table may indicate how the transmissions of an incoming MAC PDU are mapped to sub-frames in a given base pattern 304, 504. For example, the table may indicate that the WTRU 102 may allocate an even number of sub-frames for one MAC PDU and an odd number of sub-frames for another MAC PDU. In another example, the table may indicate that the WTRU 102 may allocate a first n sub-frames for the first incoming MAC PDU, a next m sub-frames for the next incoming MAC PDU, and so on In an embodiment, the WTRU 102 may be equipped with multiple antennas, and may employ different base patterns 304, 504 for each transmit antenna using, for example, a spatial multiplexing technique. To determine the base patterns 304, 504, the WTRU 102 may be configured using one or more parameters, in any combination or order, including orthogonality, interference considerations, WTRU 102 capabilities, WAN data traffic and pseudo-random selection. In an embodiment, the choice of base patterns 304, 504 may exclude those that are non-orthogonal in order to maximize the data transmission and reduce possible interference. In an embodiment, the WTRU 102 may be configured to select a corresponding base pattern 304, 504 by pseudo-random selection, in consideration of one or more of identifiers, the number of MAC PDUs and/or CRCs.

In an embodiment, the WTRU 102 may be configured to transmit only the first $N_{tx}$ H-ARQ transmissions of a given base pattern 304, 504, where $N_{tx}$ may be configured via higher layers.

In another embodiment, the WTRU 102 may be configured to employ additional signaling to achieve higher data transmission capability. The additional signaling may be accomplished by, for example, defining additional bits in the SA 302, 502 and/or sending multiple SAs 302, 502.

With respect to defining additional bits in the SA 302, 502, the WTRU 102 may be configured to include one or more of the following information in the contents of the SA 302, 502: MCS-related parameters, individual base pattern indices, a special set of bits to indicate a combination of two or more base patterns 304, 504, a special set of bits to extend a base pattern 304, 504, a number of blind re-transmissions 208, a spatial multiplexing index, and/or a pattern extension mode.

In an embodiment, the WTRU 102 may be configured to apply more dynamic MCS-related parameters, such as higher order modulation (e.g., 64 quadrature amplitude modulation (QAM)) or a higher code-rate (e.g., close to 1). This may be advantageous in D2D communication in which destination WTRUs 102 are nearby or when coverage is not the main concern for the D2D communication.

In an embodiment, the WTRU 102 may be configured to signal more base pattern-related indices when individual multiple base patterns 304, 504 may be employed.

In an embodiment, the WTRU 102 may be configured to indicate a special combination of base patterns 304, 504 using a pre-configured table. To accommodate various combinations of base patterns 304, 504, the WTRU 102 may use special bit fields.

In an embodiment, the WTRU 102 may be configured to extend a base pattern 304, 504 with adjacent or non-adjacent resources.

In an embodiment, the WTRU 102 may be configured to indicate the required number of re-transmissions 208 from a pre-determined set (e.g., {1, 2, 4, 8}).

In an embodiment, the WTRU 102 may be configured to indicate whether spatial multiplexing is enabled or not. If it is enabled, a pre-determined table for each transmit antenna may be used for the corresponding choice of base patterns 304, 504.

In an embodiment, the WTRU 102 may be configured to indicate the mode of base pattern extension or combination. For example, the WTRU 102 may indicate via this parameter whether the base patterns 304, 504 are extended, combined or untouched. The WTRU 102 may further interpret other parameters, such as the individual base pattern indices, differently depending on the value of the base pattern extension mode.

In an embodiment, the WTRU 102 may be configured to transmit two or more SAs 302, 502 for increased robustness and additional signaling purposes. It may be assumed that the time and/or frequency resources used for the multiple SA 302, 502 messages are known to the WTRU 102. Based on this assumption, the WTRU 102 may be configured by sending multiple SAs 302, 502 of the same content. For example, the WTRU 102 may be configured by sending additional control signaling from multiple SAs 302, 502 via a pre-determined combination of time and frequency allocations. In this case, the WTRU 102 may have a pre-configured table with a list of special signaling mapping to a special combination of time and frequency resources. Benefits of this may be its simplicity and robustness.

Figure 10A:
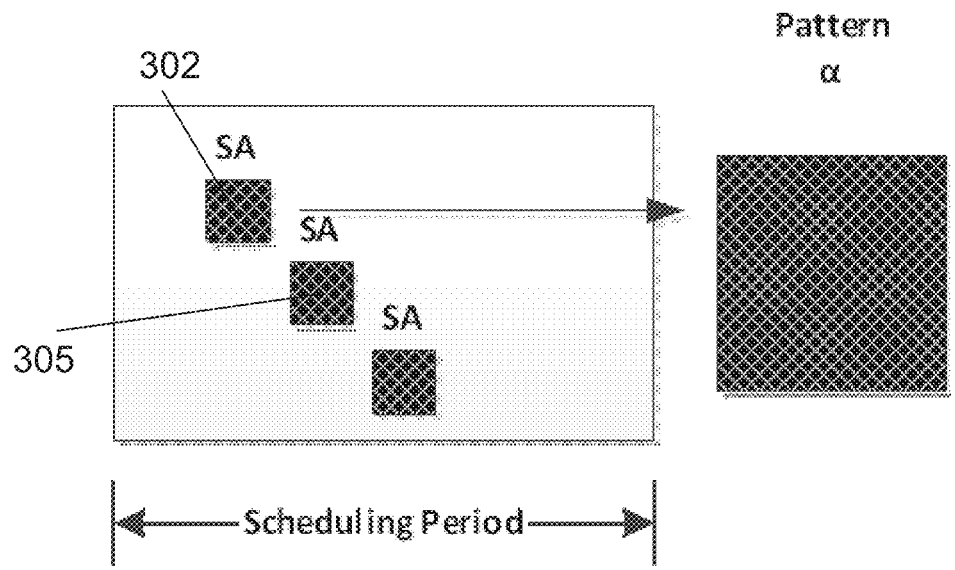
FIGS. 10A and 10B are diagrams illustrating examples of sending multiple SAs with the same content in different patterns.
Figure 10B:
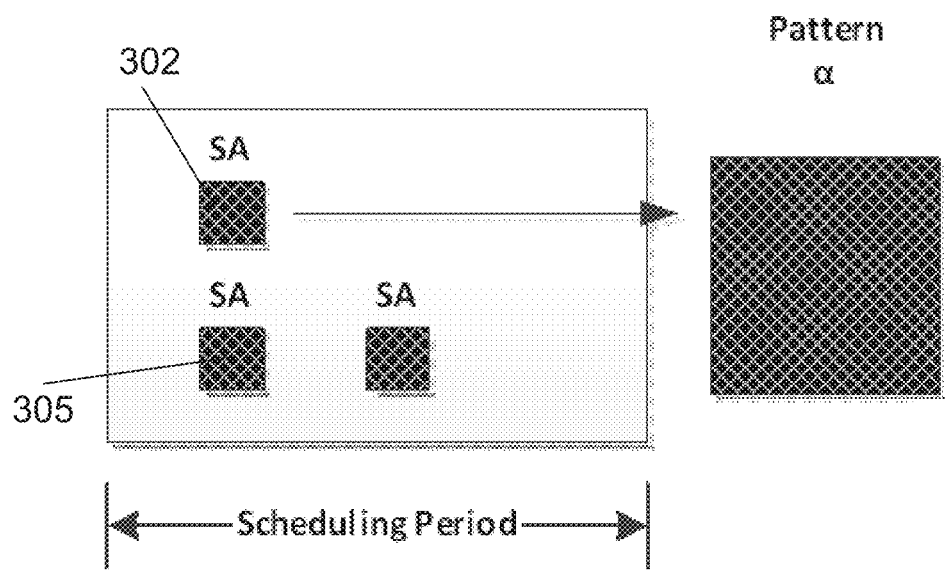

Referring now to FIGS. 10A and 10B, diagrams illustrating examples of sending multiple SAs 302, 502 with the same content using different patterns are shown. In FIG. 10A, the time/frequency locations of the SAs 302, 502 may indicate that the WTRU 102 is configured to extend the base pattern 304, 504 to both its adjacent time and frequency resources. In FIG. 10B, the time/locations of the SAs 302, 502 may indicate that the WTRU 102 is configured to combine two base patterns 304, 504. These base pattern indices may be derived from the time/frequency location of SAs 302, 502 during the scheduling period 308, 512.

The multiple SAs 302, 502, each with a capability of conveying it bits of information, may be pre-configured to signal m>n bits of control information by allowing each SA 302, 502 to carry different content. In this case, the WTRU 102 may have a pre-configured table with a list of special signaling mapping to a special combination of contents to each SA 302, 502. This may accommodate more control signaling.

To achieve more efficient data transmission for D2D communications, the WTRU 120 may be configured for more resources in one or more of a base pattern 304, 504 and/or a data transmission period 306, 510 by using one or more of changing destination identifiers and/or allowing the WTRU 102 to not use all the transmission opportunities.

In an embodiment, when identifying the need for accommodating more destination identifiers, the WTRU 102 may be configured with a pre-determined table. The table may indicate when to apply different identifiers for the incoming MAC PDUs and on which sub-frames in the given base pattern 304, 504. For example, the table may indicate that the WTRU 102 may allocate an even number of sub-frames for one destination identifier and an odd number of sub-frames for another destination identifier. In another example, the table may indicate that the WTRU 102 may allocate an even number of base patterns 304, 504 for one destination identifier and an odd number of base patterns 304, 504 for another destination identifier. In another example, the table may indicate that the WTRU 102 may allocate a first n sub-frames for the first destination identifier, a next m sub-frames for the next destination identifier, and so on. In another example, the table may indicate that the WTRU 102 allocate a first n base patterns 304, 504 for the first destination identifier, a next m base patterns 304, 504 for the next destination identifier, and so on.

In an embodiment, the transmit WTRU 102 may be configured to use only some of the transmission opportunities during the transmission period 306, 510. The WTRU 102 may be configured to exploit the un-used transmission opportunities for one or more of the following purposes: indicating that data transmission is finished, indicating that the resources are available, sending reference signals, sending additional D2D control signals, measuring possible interference, receiving possible configuration signals from nearby base stations 114, receiving data from destination WTRUs 102, and/or receiving feedback information.

In an embodiment, the WTRU 102 may be configured to select one or more base patterns 304, 504 for transmission. In one example, the WTRU 102 may perform base pattern selection shortly before the beginning of a new scheduling period 308, 512 or before transmission of the SA 302, 502 associated with an upcoming scheduling period 308, 512. In another example, the WTRU 102 may be configured to select a base pattern 304, 504 for a given scheduling period 302, 502 first by selecting a family of base patterns and then a particular pattern 304, 504 in the base pattern family. In another example, the WTRU 102 may be configured to jointly select one or more transmission pools and their corresponding family of base patterns first, for example based on the desired transmission rate, the scheduling period 302, 502, or the like. The WTRU 102 may then select a particular base pattern 304, 504 in the base pattern family.

A family of base patterns may include base patterns 304, 504 having sub-frames that are reserved for D2D transmissions only. This may be achieved by the configuring of transmission pools, which may include sub-frame bitmapping for D2D resources, number of D2D sub-frames in a repetition cycle of the resource pool, and so forth. The transmission pools may be signaled via radio resource control (RRC) signaling, or may be pre-configured, for example, in the WTRU 102 when out-of-network coverage.

In some cases, the WTRU 102 may be configured to jointly select a base pattern family as well as one or more transmission pools from the available sources of transmission pools. In one example, the WTRU 102 may be configured to select one or more specific transmission pools, using one or more of the following considerations in any order or combination: interference mitigation; priority of predetermined data transmissions (e.g., public safety); transmission requirements (including desired rate, applications, services); measurements; and/or other considerations.

A base pattern family may be characterized, for example, by one or more of the following elements: base pattern length, number of transmissions, and/or orthogonality characteristic of the family. The base pattern length may be the number of sub-frames over which the base pattern 304, 504 is defined. The number of transmissions may be the number of transmission sub-frames for the base pattern 304, 504, and in one example may correspond to the number of H-ARQ transmissions. The orthogonality characteristic of the base pattern family may express, for example, the maximum number of sub-frames that any two base patterns 304, 504 in the family may overlap with each other (referred to herein as maximum overlap). In general, the orthogonality characteristic of the base pattern family may provide a metric or characterize the orthogonality between base patterns 304, 504 of the same family The base patterns 304, 504 may be expressed in one or more tables. Table 1 below provides an example of a base pattern table. Each entry may be indexed by a given pattern number. A family index has also been assigned in the Family # column. In this example, each base pattern family corresponds to a combination of base pattern length, number of transmission opportunities, and maximum overlap between any two entries in the base pattern family. The entries in the Base Pattern column may indicate the transmission pattern: a 1 indicates a transmission opportunity and a 0 indicates no transmission. The length of the base pattern 304, 504 corresponds to a given Base Pattern Length, the number of 1s is given by the Number of TX column and the maximum number of overlapping transmission opportunities between any two base patterns 304, 504 for a given base pattern family is given by the Max. Overlap column.

TABLE 1

| # | Base Pattern | Family # | Base Pattern Length | Number of TX | Max. Overlap |
|---|---|---|---|---|---|
| 0 | [11111000000000000000] | 0 | 20 | 5 | 0 |
| 1 | [00000111110000000000] | | | | |
| 2 | [00000000001111100000] | | | | |
| 3 | [00000000000000011111] | | | | |
| 4 | [1111100000] | 1 | 10 | 5 | 0 |
| 5 | [0000011111] | | | | |
| 6 | [1111000000] | 2 | 10 | 4 | 2 |
| 7 | [1100110000] | | | | |
| 8 | [1100001100] | | | | |
| 9 | [1100000011] | | | | |
| 10 | [1010101000] | | | | |
| 11 | [1010010100] | | | | |
| 12 | [1001100100] | | | | |
| 13 | [1001011000] | | | | |
| 14 | [0110100100] | | | | |
| 15 | [0110011000] | | | | |
| 16 | [0101101000] | | | | |
| 17 | [0101010100] | | | | |
| 18 | [0011110000] | | | | |
| 19 | [0011001100] | | | | |
| 20 | [0011000011] | | | | |
| 21 | [0000111100] | | | | |
| 22 | [0000110011] | | | | |
| 23 | [0000001111] | | | | |
| 24 | [11111111] | 3 | 8 | 8 | 0 |
| 25 | [00001111] | 4 | 8 | 4 | 2 |
| 26 | [11110000] | | | | |
| 27 | [11000011] | | | | |
| 28 | [00111100] | | | | |
| 29 | [00110011] | | | | |

TABLE 1-continued

| # | Base Pattern | Family # | Base Pattern Length | Number of TX | Max. Overlap |
|---|---|---|---|---|---|
| 30 | [11001100] | | | | |
| 31 | [11000000] | 5 | 8 | 2 | 1 |
| 32 | [01100000] | | | | |
| 33 | [00110000] | | | | |
| 34 | [00011000] | | | | |
| 35 | [00000011] | | | | |
| 36 | [10000000] | 6 | 8 | 1 | 0 |
| 37 | [01000000] | | | | |
| 38 | [00100000] | | | | |
| 39 | [00010000] | | | | |
| 40 | [00001000] | | | | |

The WTRU 102 may be configured to determine a family of base patterns 304, 504 to use for D2D transmission in an upcoming scheduling period 308, 512. The determination may be based on one or more of the following example parameters, in any order or combination: service type/QoS/QCI, scheduling period 308, 512, delay/rate requirement, coverage scenario/conditions, amount of data in buffer/buffer status (e.g. the number of accumulated MAC PDUs in the buffer), application data rate, number of D2D transmission occasions (as configured, for example, by the base station 114), estimated number of MAC PDUs to be transmitted during the scheduling period 308, 512, measurements/SA reception (e.g., estimate of resource availability, interference measurement, and/or reception of SA 302, 502 from other WTRUs 102 indicating which pattern family is currently being used), unicast versus multicast/groupcast/broadcast operations, number of surrounding D2D WTRUs 102 (e.g. in a cell or within 1 km), RRC configurations, and/or transmission pools.

The following examples show how a WTRU 102 may use these parameters to determine a base pattern 304, 504 to use for D2D transmission in an upcoming scheduling period 308, 512. While the examples are described individually, it should be understood that, in practice, a WTRU 102 may be configured to use the examples in any order or combination. It should be further understood that while the following examples are described with respect to a WTRU 102 selecting a single base pattern family, the examples may also apply for the WTRU 102 to select more than one base pattern family.

The WTRU 102 may be configured to determine a base pattern family to use based on its coverage scenario. In one example, the WTRU 102 may be configured to use a base pattern family with a predetermined base pattern length. For example, a WTRU 102 may decide to use a pre-defined base pattern length, for example, a base pattern length of 20, when out-of-coverage. When in-coverage, the WTRU 102 may be configured to receive a configuration for base pattern length from the base station 114. The explicit configuration when in-coverage may be carried out via RRC signaling (e.g., via dedicated signaling or system information blocks (SIBs)). The base station 114 may also indicate to the WTRU 102 to use a default base pattern family (e.g., the WTRU 102 may be configured with a default base pattern family or base pattern length when operating in coverage).

In another example, the WTRU 102 may be configured to use a fixed base pattern family based on service/application requirements (e.g., QoS/QCI requirements). The WTRU 102 may be configured, for example, to use a specified base pattern family when transmitting VoIP traffic (e.g., family index #0 with 5 transmissions).

In another example, based on service/application requirements, the WTRU 102 may be configured to select a different base pattern family for each scheduling cycle. More specifically, the WTRU 102 may be configured, for example, to transmit D2D data subject to a resource pool bitmap. In a scheduling period 308, 512, the WTRU 102 may need to determine a suitable base pattern length first, and then select the corresponding base pattern family.

In another example, the WTRU 102 may be configured to select a base pattern family that supports at least 5 transmissions every 20 ms, for example, for VoIP. The WTRU 102 may first determine the number of D2D transmission occasions during a given scheduling period 308, 512. This may be determined, for example, based on the configuration received from a base station 114 when operating in coverage. In another embodiment, the number of D2D transmission occasions may be predetermined when outside of network coverage in, for example, a universal subscriber identity module (USIM), an application, or fixed in the specifications.

In an embodiment, the WTRU 102 may further determine how many D2D transmission occasions there are, on average, for each 20 ms period. This may be done by simple division (e.g., ignoring the remainder or applying a floor operation). The WTRU 102 may then select the base pattern length based on this number.

The WTRU 102 may select the base pattern family based on the required number of transmissions and the base pattern length. The WTRU 102 may be configured to select the base pattern family that has the least number of overlapping sub-frames between base patterns in the family. In practice, however, it is likely that the Max. Overlap parameter may be dependent on the base pattern length and the number of transmissions.

In another example, the WTRU 102 may be configured to estimate the number of MAC PDUs it needs to transmit in the upcoming scheduling period 308, 512. The WTRU 102 may then select the base pattern length supporting the number of MAC PDU transmissions, given the transmission occasions.

In an embodiment, the WTRU 102 may determine if it requires more than one blind re-transmission (e.g., H-ARQ process). The WTRU 102 may determine the number of required H-ARQ processes needed for the upcoming scheduling period 308, 512. The WTRU 102 may base this decision, for example, on one or more of the following: the amount of data in the buffer, the service delay requirement, and/or the estimated amount of data to be generated for a given interval of time (e.g., during the next scheduling period 308, 512). For example, when using a physical uplink shared channel (PUSCH) transmission as in conventional LTE uplink transmissions or D2D communications, it may be desirable to only transmit a single MAC PDU (or a single H-ARQ process) at each sub-frame. This may ensure that the transmission maintains its single-carrier orthogonal frequency division multiple access (SC-OFDMA) properties and that the transmitter can make better use of its power amplifier.

In an embodiment in which the WTRU 102 determines that it requires more than one H-ARQ process during a scheduling period 308, 512, the WTRU 102 may be configured to select one or more base patterns 304, 504 from a base pattern family with 0 Max. Overlap (e.g., fully orthogonal in time). This may ensure that multiple H-ARQ processes can be assigned to different non-overlapping base patterns 304, 504. Alternatively, the WTRU 102 may be configured to select the base patterns 304, 504 from a set of mutually time-orthogonal base patterns 304, 504 in a given base pattern family. That is, within each base pattern family, there may be some combination of base patterns 304, 504 that are time-orthogonal. The WTRU 102 may then assign each H-ARQ process to a different time-orthogonal base pattern 304, 504 for transmission.

In an embodiment, the WTRU 102 may be configured to determine whether the communication to be carried out is of a unicast, multicast, groupcast, or broadcast nature. The WTRU 102 may then be configured to determine a base pattern family specific to unicast communication if the communication to be carried out is of a unicast nature. Alternatively, the WTRU 102 may be configured to determine a base pattern family that is specific to multicast, groupcast, or broadcast if the communication to be carried out is of a multicast, groupcast, or broadcast nature.

Depending on delay requirements and the number of accumulated MAC PDUs in the buffer, the WTRU 102 may be configured to determine a base pattern family on the basis of an associated base pattern length or number of transmissions. In one example, if the buffer is almost full, the WTRU 102 may select a base pattern family having family parameters to empty the buffer (e.g., longer base pattern length or larger number of transmissions). In another example, the WTRU 102 may be configured to select a base pattern family having family parameters for non-delay-sensitive applications such as sending emails or web browsing (e.g., shorter base pattern length or smaller number of transmissions).

In an embodiment in which there may be one or more transmit D2D WTRUs 102 within a predetermined range of the WTRU 102, the WTRU 102 may be configured to use a base pattern family having family parameters including a short base pattern length, smaller number of transmissions, or smaller maximum overlap between any two entries in the family. By doing so, the WTRU 102 may enhance its capability to listen to other transmit WTRUs 102 and reduce the probability of collisions and interference of the data transmissions. In an embodiment in which there are few (e.g. less than 2) or no transmit WTRUs within a predetermined range of the WTRU 102, the WTRU 102 may select a base pattern family having family parameters including longer base pattern lengths or a larger number of transmissions. The predetermined range may be, for example, the same cell as the WTRU 102 or within a certain distance (e.g., 1 km) of the WTRU 102.

In an embodiment, the WTRU 102 may be configured to use a base pattern family based on pre-configured or chosen transmission pools. In one example, the WTRU 102 may be configured with a base pattern family determined by the distribution of 1's in the bitmap in order to meet, for example, a desired transmission rate. In another example, the WTRU 102 may select a base pattern family having specified family parameters (e.g., base pattern length or number of transmissions) that allow the WTRU 102 to finish data transmission within a scheduling period 308, 512.

The WTRU 102 may also be configured to select one or more base patterns 304, 504 from a specific base pattern family. More specifically, once the WTRU 102 has determined the base pattern family, the WTRU 102 may be configured to select one or more base patterns 304, 504 from that base pattern family for D2D data transmission.

In an embodiment, the WTRU 102 may be configured to select a base pattern 304, 504 from a given base pattern family randomly, for example, using a uniform distribution. This approach may be used, for example, when the WTRU 102 has no prior knowledge of what other WTRUs 102 may be using.

In an embodiment, the WTRU 102 may be configured to select a base pattern 304, 504 from a given base pattern family based on one or more identifiers. In one example, the WTRU 102 may be configured to select a base pattern 304, 504 based on an operation on an identifier, such as, for example, a modulo operation.

The WTRU 102 may be configured to select a base pattern 304, 504 from a given base pattern family based on the result of a pseudo-random generator. In an embodiment, the pseudo-random generator may be initialized with an identifier, such as a unique WTRU 102 identifier (e.g., radio network temporary identifier (RNTI), an international mobile subscriber identity (IMSI), or a group identifier) and iterated with a known time variable such as a system frame number (SFN). This approach may, for example, ensure that two WTRUs 102 do not constantly select the same base patterns 304, 504.

In an embodiment, the WTRU 102 may be configured to perform measurements and/or detect one or more SAs 308, 512 from different WTRUs 102 to determine which base pattern 304, 504 to use for transmission. In one example, the WTRU 102 may be configured to determine a set of base patterns 304, 504 already in use by other WTRUs 102 from the measurements/SA 308, 512 reception. The WTRU 102 may use this information to determine which base pattern 304, 504 to use for transmission.

More specifically, the WTRU 102 may be configured to select one or more base patterns 304, 504 that are time-orthogonal with respect to the base patterns 304, 504 that are determined to be in use by other WTRUs 102. This approach may allow the WTRU 102 to avoid interference from other transmissions. In the event that no time-orthogonal base pattern 304, 504 may be found (e.g., all time-orthogonal base patterns 304, 504 are already found to be in use), the WTRU 102 may be configured to select a base pattern 304, 504 that has the least amount of overlap in time with the base patterns 304, 504 in use.

This may be achieved, for example, by determining a correlation between pairs of base patterns 304, 504. For example, the WTRU 102 may be configured to determine a correlation metric for each pair of base patterns 304, 504. In an embodiment, this correlation metric may take into account not only the time pattern but also the frequency hopping and/or measured received power. The WTRU 102 may then be configured to select base patterns 304, 504 that have the best correlation metric (e.g., small correlation) with the base patterns 304, 504 currently determined to be in use by other WTRUs.

The selection of transmission parameters for D2D communication as used in some embodiments is further described herein. For example, selection of MCS and number of resource blocks (RBs) to be transmitted are described. In some examples, the transmitting WTRU 102 may select at least one of a number of RBs and select the MCS to be used for all transmissions of a scheduling period 308, 512.

In some embodiments, there may be a pre-defined mapping between a combination of MCS, number of RBs, number of spatially multiplexed layers on one hand, and a transport block size on the other hand. The mapping may be such that multiple combinations map to the same transport block size. The pre-defined mapping may be identical to the mapping used for transmissions to and from the network.

In some embodiments, the WTRU 102 may first determine the size of transport blocks to be transmitted over the scheduling period 308, 512, and then select one combination of MCS, number of RBs, and number of layers that is mapped to the determined transport block size. In an embodiment, the combination of MCS, number of RBs, and number of layers may be restricted to be one of a pre-defined or configured subset of values. For instance: only MCS corresponding to QPSK modulation, only number of RBs between a pre-defined or configured minimum and maximum values, and/or only single-layer transmissions. In an embodiment, the combination of MCS, number of RBs, and number of layers may be one for which a specific metric is the largest, or the closest to a pre-defined or configured target value. The metric may include: a number of RBs, MCS index, spectral efficiency, number of transmission layers, a coding rate (defined in terms of ratio of information bits to coded bits, or in terms of ratio of information bits to coded modulation symbols), a ratio between number of RBs (or bandwidth) and MCS index, and/or a ratio between number of RB's and spectral efficiency.

The selections of T-RPT and transport block size for D2D communication as used in some embodiments are described herein. In an example, the WTRU 102 may select at least one of a T-RPT pattern and a transport block size (S) to be used for all transmissions of a scheduling period 308, 512. In an example, the WTRU 102 may first determine a number of information bits (B) that are to be transmitted over a scheduling period 308, 512. This number may be determined taking into account at least one of the following criteria: a pre-defined or configured minimum and/or maximum value for B; a target information bit rate from a higher layer (e.g., packet data convergence protocol (PDCP) or radio link control (RLC)); the duration of the scheduling period 308, 512; a maximum or target transmission latency; a maximum or target transmission buffer size; a number of bits required for MAC, RLC or PDCP protocol headers; a step size to be used for adaptively changing the bit rate; and the state of a transmission buffer. The state of the transmission buffer may be determined using the number of bits, a duration of time since a SDU arrived in the buffer, or the largest value thereof.

For example, the WTRU 102 may determine that the number of information bits to transmit over the scheduling period 308, 512 may correspond to the sum of the number of information bits currently in the transmission buffer and the number of bits required for protocol headers.

In another example, the WTRU 102 may target a predetermined buffer size and/or latency. The WTRU 102 may step up the value of B (up to a maximum) when the buffer size and/or latency is above a target, and step down the value of B (down to a minimum) when the buffer size and/or latency is below a target. After the WTRU 102 has determined a number of information bits B, the WTRU 102 may determine a combination of a transport block size S and of a T-RPT pattern allowing for the transmission of B bits over the scheduling period 308, 512.

The number of information bits that are possible to be transmitted over the scheduling period 308, 512 may be a function of one or more parameters. One parameter may be the number of total subframes of the scheduling period 308, 512, for instance, the number of subframes may be 160. Another parameter may be the number of subframes available for transmission (K) in a T-RPT pattern of N subframes, for instance, K may be one of 1, 2, 4 or 8). Another parameter may be the number of subframes available for D2D transmissions (D) within a scheduling period 308, 512, given the used D2D transmission pool. For instance, D may be equal to 80 in case the number of subframes in the scheduling period 308, 512 is 160 and the D2D transmission pool is such that half of the subframes are available to D2D. Another parameter may be the number of subframes used for the transmission of a single transport block (R), for instance, R may be equal to 4.

Using the parameters above, the number of information bits that may be transmitted over the scheduling period 308, 512 may be equal to $$\frac{S \times D \times K}{N \times R}. \qquad \text{Equation (1)}$$

The WTRU 102 may select at least one set of values for S and K, such that the following condition is satisfied:

$$S \times K \geq B \times N \times \frac{R}{D}. \qquad \text{Equation (2)}$$

In some examples, at least one of the parameters S and K may be selected such that the difference $$(S \times K) - \left(B \times N \times \frac{R}{D}\right) \qquad \text{Equation (3)}$$

is minimized while remaining a non-negative value. This allows minimization of padding or of the number of unused subframes in the T-RPT pattern. For instance, if S is fixed to a certain value, K may be selected to be the smallest value for which Equation (2) is satisfied.

In an embodiment in which Equation (2) may be satisfied with more than one combination of values for S and K, the set of possible combinations may be reduced based on at least one of restriction. In an embodiment, the set of possible combinations may be reduced based on a pre-defined or configured set of possible values of S. For instance, a maximum value of S may be derived from a maximum value of MCS and/or number of RBs. In an embodiment, a unique value of S may be configured or pre-defined for a given application. In an embodiment, the value of S may have to be adjusted up or down to one of a finite set of valid transport block size values, wherein a valid transport block size value is one that can be associated to a combination of MCS, number of RBs and number of transmission layers according to a pre-defined mapping.

In an embodiment, the set of possible combinations of S and K values may be reduced based on a pre-defined or configured set of possible values for K. For instance, K may be restricted to be one of 1, 2, 4 or 8. In an embodiment, the value of K to be used may be configured by higher layers to be 4. In an embodiment, the combination of S and K values may be one for which a specific quantity is the largest, the smallest, or the closest to a pre-defined or configured target value. The metric may be or may include S or K.

In an embodiment, the set of possible combinations of S and K values may be reduced based on a level of priority associated to the transmission. For instance, K may be selected to be a larger value when the priority of the transmission is higher.

In an embodiment, the set of possible combinations of S and K values may be reduced based on the number of received SAs 302, 502 from other WTRUs 102 within a period of time. For instance, a first maximum value of K may be used if this number of higher than a threshold, and a second maximum value of K may be used if this number is lower than a threshold. This may allow for the selection of a T-RPT pattern with more subframes available for reception when there is a higher number of WTRUs 102 transmitting.

In an embodiment, the WTRU 102 may select a T-RPT pattern from among a subset of T-RPT patterns. In the following, several examples of conditions that may be used to determine a subset of T-RPT patterns to select from are described. It is noted that such conditions may be used in combination. For instance, the subset from which the WTRU 102 selects a T-RPT pattern may be the intersection of subsets obtained from different conditions. The subset from which a T-RPT pattern is selected, the values of the parameters used for the determination of the subset, and whether such parameters are used may depend on whether the WTRU 102 performs a unicast, multicast or broadcast transmission, or on the destination WTRU 102 or group of WTRUs 120.

In an embodiment, the WTRU 102 may select a T-RPT pattern among a subset of T-RPT patterns that have K out of N subframes available for transmission. The value K may be part of at least one of the possible combinations of K and S taking into account the restrictions described above. For instance, the set of K and S combinations may include a first combination K=2 and S=600 bits, and a second combination K=4 and S=300 bits. In this case, the WTRU 102 may select one T-RPT pattern among the set of T-RPT patterns for which K=2 or K=4. In an embodiment, the selection may be random. The selected combination for K and S may then depend on the value of K corresponding to the selected T-RPT pattern. Alternatively, the WTRU 102 may first randomly select a combination of K and S among the set of possible combinations of K and S, and then randomly select a T-RPT pattern within the set of patterns that have the corresponding value of K.

In an embodiment, the subset of T-RPT patterns may include T-RPT patterns that have a certain maximum overlap (or equivalently minimum distance, such as Euclidean distance) with each other. If the maximum overlap is 0 then the subset of T-RPT patterns may be considered orthogonal. In an embodiment, the possible subsets of T-RPT patterns that have a certain maximum overlap may be pre-defined. For instance, a subset of T-RPT patterns may be constructed from the set of all cyclic shifts of a given T-RPT pattern for which the condition of maximum overlap is satisfied. In an embodiment, the value of the maximum overlap may be pre-defined, pre-configured, or signaled by higher layers. Alternatively, the maximum overlap for a subset of T-RPT patterns may be implicitly derived, or tied to, the value of K. For example, if the value of K for a subset of T-RPT patterns is 2, then the maximum overlap may be 0. If the value of K for a subset of T-RPT patterns is 4, then the maximum overlap may be 2.

In an embodiment, the subset of T-RPT patterns may include T-RPT patterns derived from at least one reference T-RPT pattern. The reference T-RPT pattern may be pre-configured or signaled by higher layers (for instance, using system information). In an embodiment, the signaling from higher layers may include a T-RPT index or a bitmap.

One or more of the above embodiments may be combined such that the subset of T-RPT patterns includes a pre-defined subset of orthogonal T-RPT patterns. The subset of orthogonal T-RPT patterns may be constructed from a set of cyclic shifts of a signaled reference T-RPT pattern, such that the patterns are mutually orthogonal. For example, if the reference T-RPT pattern is [1 1 0 0 0 0 0 0], then the subset of orthogonal T-RPT patterns may be defined as the following: [1 1000 0 0], [0 0 1 100 0 0], [000011 0 0], [0000 0 0 1 1]. In another example, if the reference T-RPT pattern is [1 0 1 0 0 0 0 0], then the subset of orthogonal T-RPT patterns may be defined as: [1 0 1 0 0 0 0 0], [0 1 0 1 0 0 0 0], [0 0 0 0 1 0 1 0] and [0 0 0 0 0 1 0 1].

In an embodiment, the subset of T-RPT patterns may include T-RPT patterns that share at least one subframe available for transmission (or at least one subframe not available for transmission) with a reference T-RPT pattern. The subset of T-RPT patterns may include T-RPT patterns that share a specific number of such subframes, T-RPT patterns that share at least a number of such subframes, or T-RPT patterns that share at most a number of such subframes. The number of shared subframes (which may also be referred to as "overlap") may be pre-configured, pre-determined or signaled by higher layers, or may be the number of subframes available for transmission (or not available for transmission) in the reference T-RPT pattern. For example, in a case where a reference T-RPT pattern includes the following: [1 1 0 0 0 0 0 0], then the subset of T-RPT patterns may include only those patterns for which at least the two first subframes are available for transmission (i.e., the subset of patterns defined as [1 1 x x x x x x], where x may be 0 or 1).

Alternatively, the subset of T-RPT patterns may consist of T-RPT patterns that do not share any subframes available for transmission (or that share at most a certain number of subframes available for transmission) with a reference T-RPT pattern. The maximum number of subframes that can be shared may be pre-defined, pre-configured or signaled by higher layers. For example, in a case where a reference T-RPT pattern includes the following: [1 1 0 0 0 0 0 0], then the subset of T-RPT patterns may include only those patterns for which at least the two first subframes are not available for transmission (i.e., the subset of patterns defined as [0 0 x x x x x x], where x may be 0 or 1).

In an embodiment, the WTRU 102 may map possible T-RPT patterns without an explicit table of possible T-RPT patterns. In some examples, a T-RPT pattern of N subframes may be indicated by a field of B bits, where B may be smaller than N if the set of possible T-RPT patterns is restricted. For instance, the T-RPT pattern may be restricted to contain K subframes available for transmission, where K is one of a finite set of values.

In an embodiment, the transmitting and receiving WTRUs 102 may derive a T-RPT pattern from a T-RPT field using at least one of the following operations on the T-RPT field. The T-RPT pattern may be derived by determining the total number of "1" bits in the binary representation of the T-RPT field and selecting an operation on the T-RPT field based on the value of this number. The T-RPT pattern may be derived by inserting a "0" or a "1" at a specific position of the binary representation of the T-RPT field, including pre-pending or appending. The T-RPT pattern may be derived by swapping the values of the binary representation of the T-RPT field (i.e., changing "0" to "1" and vice-versa) or equivalently performing a "NOT" operation on each bit of the binary representation of the T-RPT field (i.e., bitwise NOT). The T-RPT pattern may be derived by interpreting a "1" as a subframe available for transmission, and a "0" as a subframe not available for transmission (or vice-versa).

For instance, in case where N=8, B=7 and K is restricted to be one of 1, 2, 4 or 8, the following procedure may be applied to derive a T-RPT pattern from the T-RPT field. In a first step, the number of "1" in the binary representation of the T-RPT field may be counted and denoted as "m." In an embodiment in which the value of "m" is 2 or 4, the T-RPT pattern may be determined by appending "0" to the binary representation of the T-RPT field. In an embodiment in which the value of "m" is 0, 1, 3 or 7, the T-RPT pattern may be determined by appending "1" to the binary representation of the T-RPT field. In an embodiment in which the value of "m" is 6, the T-RPT pattern may be determined by applying a bitwise NOT operation on the binary representation of the T-RPT field, and appending "0" to the result. In an embodiment in which the value of "m" is 5, the T-RPT field may not indicate a valid T-RPT pattern. Such values may be used for other signaling purposes.

For the reverse operation, determining a T-RPT field as a function of T-RPT pattern, at least one of the following operations may be used. The T-RPT field may be determined by representing a T-RPT pattern by a series of N number of "0s" and "1s", where "0" may represent a subframe not available for transmission and "1" a subframe available for transmission (or vice-versa). The T-RPT field may be determined by selecting an operation on the T-RPT pattern representation as a function of K or the value of a specific bit of a representation. The T-RPT field may be determined by deleting a bit at a specific position of the binary representation of the T-RPT pattern, swapping the values of the binary representation of the T-RPT pattern (i.e., changing "0" to "1" and vice-versa), or equivalently performing a "NOT" operation on each bit of the binary representation of the field (bitwise NOT).

For instance, the following procedure may be applied to derive the T-RPT field from a T-RPT pattern. In an embodiment in which K is 2, 4 or 8, the T-RPT field may be obtained by deleting the last bit from the T-RPT pattern binary representation. In an embodiment in which K is 1 and the last bit represents a subframe not available for transmission (e.g. "0"), the T-RPT field may be obtained by applying a bitwise NOT operation on the binary representation of the T-RPT pattern and deleting the last bit. In an embodiment in which K is 1 and the last bit represents a subframe available for transmission (e.g. "1"), the T-RPT field may comprise of a sequence of 7 "0s", i.e. m=0.

In an embodiment, an "invalid" T-RPT index code may be used in multiple scenarios. For example, the settings of a T-RPT field contained in a SA 302, 502 or a D2D Grant to a particular value may be used to signal or convey information other than actual information about transmission occasion patterns or T-RPT patterns to receivers.

In an embodiment, a first number of T-RPT code points may be used to convey information about T-RPT pattern settings to receivers. A second number of T-RPT code points may be used as special values with the intent to convey signaling or configuration related to other purposes. For example, if N=7 bits are in use for the T-RPT bit field in a SA 302, 502 or in a D2D Grant, Ni=120 values may correspond to actual well-defined T-RPT patterns in the form of base or combined patterns. These may indicate subframes in which a WTRU 102 would transmit data. However, N2 values of the 7 bit field may correspond to special purpose signaling not directly indicating such T-RPT patterns. For example, the N2=7 special codepoints may correspond to 1111001, 1111010, 1111011, . . . , 1111111 and the N1=121 T-RPT values may correspond to 0000000, 0000001, 0000010, . . . , 1111000.

The special purpose signaling of selected T-RPT codepoints may correspond to either one of, or a combination of, several possible signaling purposes. A first possible signaling purpose may include activation or de-activation of a configured transmission pattern over either a single or multiple data transmission periods 306, 510 or for a duration of time. For example, a signaled special codepoint in the T-RPT field may be used to switch on a semi-static transmission pattern for data for a duration of time. Another signaled special codepoint may de-activate such a transmission pattern subject to pre-determined criteria. This semi-static transmission pattern may be pre-configured and stored on a D2D terminal, or it may be configured through RRC signaling by the base station 114. More than one of these transmission patterns may be configured simultaneously, and multiple corresponding codepoints may be used to activate or de-activate a selected transmission pattern.

Another possible signaling purpose may include differentiating the contents of the D2D channel in the data transmission period 306, 510. For example, a signaled special codepoint in the T-RPT field may be used to indicate that following contents of the D2D channel indicated through the SA 302, 502 contain control signaling rather than data. The signaled special codepoint in the T-RPT field may also distinguish a first transmission format valid in conjunction with a regular T-RPT codepoint from a second transmission format valid in conjunction with a special codepoint.

Another possible signaling purpose may include differentiating the contents and transmission format of a SA 302, 502 or a D2D Grant. For example, a special codepoint setting in either an SA 302, 502 or a D2D Grant may be used to signal to the intended receiver that the SA 302, 502 or the D2D Grant is to be decoded and interpreted differently than for a regular data transmission. The special codepoint may be used as a command issued by the transmitter to toggle on/off selected actions and decoding steps in the receiver, such as increasing or decreasing a number of decoded subframes or channels, increasing or changing activity intervals or timers, or setting these to selected values.

In another example use, the setting of an MCS field contained in a SA 302, 502 or a D2D Grant to a particular value may be used to signal or convey information other than actual information about transmission occasion patterns or T-RPT to receivers such as described before.

In another example use, the settings of T-RPT patterns and MCS fields in conjunction may be used to signal or convey special purpose signaling other than actual MCS settings or T-RPT patterns.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a first wireless transmit/receive unit (WTRU), the method comprising:
    determining a base pattern length to use for device to device (D2D) communication directly with a second WTRU based on at least a transmission configuration, wherein the base pattern length comprises a number of subframes;
    selecting, based on an indication from a network, a base pattern having the determined base pattern length, wherein the base pattern comprises one or more transmission opportunities in the number of subframes; and
    transmitting one or more data packets to the second WTRU in at least one of the one or more transmission opportunities of the base pattern.

2. The method of claim 1, wherein the indication is derived by determining a number of buffered data packets to be transmitted, determining a number of transmission opportunities required to transmit the buffered data packets in an upcoming scheduling period, and selecting a base pattern having a number of the one or more transmission opportunities corresponding to the required number of transmission opportunities.

3. The method of claim 1, wherein the indication is derived by determining whether the D2D communication is of a unicast, multicast, or broadcast nature, and if the D2D communication is of a unicast nature with feedback, selecting a base pattern having one or more base patterns with a number of available transmission opportunities that allow for feedback transmissions from the second WTRU.

4. The method of claim 1, wherein the indication is derived by determining whether the D2D communication is of a unicast, multicast, or broadcast nature, selecting an available base pattern from a predefined set of base pattern families corresponding to the determined nature of D2D communication.

5. The method of claim 1, wherein the indication is derived by choosing an available base pattern such that interference with base patterns of one or more adjacent WTRUs is minimized.

6. The method of claim 1, wherein the indication is derived by determining a required number of transmissions in an upcoming scheduling period for the D2D communication, wherein the required number of transmissions is dependent on traffic type of the D2D communication, and choosing an available base pattern with a number of available transmission opportunities corresponding to the required number of transmissions.

7. The method of claim 1, wherein the indication is derived by a random selection.

8. The method of claim 1, wherein the indication is derived using one or more identifiers.

9. The method of claim 1, wherein the indication is derived using a pseudo-random generator initialized with an identifier.

10. A wireless transmit/receive unit (WTRU), wherein the WTRU is a first WTRU, the first WTRU comprising:
    a processor; and
    an antenna operatively coupled to the processor;
    the processor configured to determine a base pattern length to use for the device to device (D2D) communication directly with a second WTRU based on at least a transmission configuration, wherein the base pattern length comprises a number of subframes;
    the processor further configured to select, based on an indication from a network, a base pattern having the determined base pattern length, wherein the base pattern comprises one or more transmission opportunities in the number of subframes; and
    the processor and the antenna configured to transmit one or more data packets to the second WTRU in at least one of the one or more transmission opportunities of the base pattern.

11. The first WTRU of claim 10, wherein the indication is derived by determining a number of buffered data packets to be transmitted, determining a number of transmission opportunities required to transmit the buffered data packets in an upcoming scheduling period, and selecting a base pattern having a number of the one or more transmission opportunities corresponding to the required number of transmission opportunities.

12. The first WTRU of claim 10, wherein the indication is derived by determining whether the D2D communication is of a unicast, multicast, or broadcast nature, and if the D2D communication is of a unicast nature with feedback, selecting a base pattern having one or more base patterns with a number of available transmission opportunities that allow for feedback transmissions from the second WTRU.

13. The first WTRU of claim 10, wherein the indication is derived by determining whether the D2D communication is of a unicast, multicast, or broadcast nature, selecting an available base pattern from a predefined set of base pattern families corresponding to the determined nature of D2D communication.

14. The first WTRU of claim 10, wherein the indication is derived by choosing an available base pattern such that interference with base patterns of one or more adjacent WTRUs is minimized.

15. The first WTRU of claim 10, wherein the indication is derived by determining a required number of transmissions in an upcoming scheduling period for the D2D communication, wherein the required number of transmissions is dependent on traffic type of the D2D communication, and choosing an available base pattern with a number of available transmission opportunities corresponding to the required number of transmissions.

16. The first WTRU of claim 10, wherein the indication is derived by a random selection.

17. The first WTRU of claim 10, wherein the indication is derived using one or more identifiers.

18. The first WTRU of claim 10, wherein the indication is derived using a pseudo-random generator initialized with an identifier.

* * * * *